United States Patent
Lu et al.

(10) Patent No.: US 10,429,169 B2
(45) Date of Patent: Oct. 1, 2019

(54) PHYSICAL PARAMETER ESTIMATING METHOD THAT DETERMINES A MATCHED ORDER OF AN INTENSITY DISTRIBUTION SIGNAL ACCORDING TO CALCULATED MAGNITUDE SPECTRUMS AND ELECTRONIC APPARATUS

(71) Applicant: Beijing Institute of Technology, Beijing (CN)

(72) Inventors: Mingfeng Lu, Beijing (CN); Jinmin Wu, Beijing (CN); Feng Zhang, Beijing (CN); Ran Tao, Beijing (CN)

(73) Assignee: Beijing Institute of Technology, Beijing (CN)

( * ) Notice: Subject to any disclaimer, the term of this patent is extended or adjusted under 35 U.S.C. 154(b) by 77 days.

(21) Appl. No.: 15/447,307

(22) Filed: Mar. 2, 2017

(65) Prior Publication Data

US 2018/0051976 A1 Feb. 22, 2018

(30) Foreign Application Priority Data

Aug. 19, 2016 (CN) .......................... 2016 1 0695189

(51) Int. Cl.
*G01B 9/02* (2006.01)
*G01B 11/24* (2006.01)

(52) U.S. Cl.
CPC ............ *G01B 9/02* (2013.01); *G01B 11/2441* (2013.01)

(58) Field of Classification Search
CPC ... G01B 9/02024; G01B 9/02; G01B 11/2441
See application file for complete search history.

(56) References Cited

U.S. PATENT DOCUMENTS

2007/0038047 A1* 2/2007 Winther ............ A61B 5/14532
600/319

\* cited by examiner

*Primary Examiner* — Hwa Andrew Lee
(74) *Attorney, Agent, or Firm* — Venable LLP

(57) ABSTRACT

A physical parameter estimating method, a physical parameter estimating device, and electronic apparatus are disclosed. The method includes: reading a Newton's rings fringe pattern of a unit to be measured; calculating a magnitude spectrum of an intensity distribution signal of at least one first-direction pixel set in the Newton's rings fringe pattern under each fractional Fourier transform (FRFT) order in a searching range of FRFT orders; determining a matched order of the intensity distribution signal according to the calculated magnitude spectrums; and estimating a physical parameter involved in the interferometric measurement according to at least the matched order. Therefore, physical parameters of the unit to be measured can be estimated with high accuracy even in presence of noise and obstacles in the fringe pattern.

17 Claims, 9 Drawing Sheets

PHYSICAL PARAMETER ESTIMATING METHOD THAT DETERMINES A MATCHED ORDER OF AN INTENSITY DISTRIBUTION SIGNAL ACCORDING TO CALCULATED MAGNITUDE SPECTRUMS AND ELECTRONIC APPARATUS

CROSS REFERENCE

This application claims the benefit of and priority to Chinese Patent Application No. 201610695189.X filed on Aug. 19, 2016, entitled "PHYSICAL PARAMETER ESTIMATING METHOD, PHYSICAL PARAMETER ESTIMATING DEVICE, AND ELECTRONIC APPARATUS", the disclosure of which is incorporated herein in its entirety by reference.

TECHNICAL FIELD

The present disclosure relates to the technical field of interferometric measurement, and more particularly, to a physical parameter estimating method, a physical parameter estimating device, an electronic apparatus, a computer program product, and a computer-readable storage medium thereof.

BACKGROUND

An accurate measurement of physical parameters of a device (for example, optical parameters of an optical device) is crucial in a procedure of device measurement and fabrication. Contact measuring methods require polishing processing on a surface of a unit to be measured, which causes abrasion to the unit, thus non-contact measuring methods are usually adopted at present.

An interferometric measurement plays an important role in the non-contact measuring methods, and a key point thereof is to analyze and process an interference fringe pattern (for example, a Newton's rings fringe pattern) generated by performing the interferometric measurement on the unit to be measured, so as to obtain various physical parameters, such as curvature radius, vertex position, wavelength of incident light, refractive index of media, deformation, displacement, film thickness or the like, of the unit.

A simplified method for processing the Newton's rings fringe pattern (a basic interference fringe pattern) is a ring-counting calculating method, which measures the interference fringe pattern by using a reading microscope, obtains diameter values of two orders of dark fringes, and calculates a physical parameter of the unit to be measured on the basis of wavelength of incident light and the diameter values. Generally speaking, for the sake of measurement accuracy, a diameter of a high-order ring, e.g., up to the $40^{th}$-order ring beginning from the 0-order center-ring, needs to be measured. The above-described ring-counting calculating method is simple to implement and has a low cost. However, it is easy for an observer to make mistakes due to visual fatigue when counting the rings, and the automation degree is low for this method. Further, since a field range of the reading microscope is relatively small, it is not possible for the observer to see the entire interference fringe pattern, i.e., intuitiveness thereof is poor.

More commonly, a typical method for processing the interference fringe pattern is a fringe centerline method, and a processing flow thereof includes: 1) denoising the interference fringe pattern; 2) performing binarization and thinning on the denoised interference fringe pattern; 3) deriving a radius and a center of the interference fringe by acquiring coordinate values of points on the thinned fringes; and 4) calculating a physical parameter of the unit to be measured, by using radius of two orders of bright or dark fringes and the wavelength of incident light. It can be seen that, as compared with the ring-counting calculating method, the fringe centerline method has a higher automation degree and a better intuitiveness.

SUMMARY

However, it is found through analysis that, although the fringe centerline method's automation degree is high, it is very sensitive to influence of noise in the processing procedure. Therefore, the estimation accuracy of the physical parameters of the unit to be measured significantly relies on the quality of the interference fringe pattern. For example, when an occlusion issue exists in the interference fringe pattern, the physical parameters cannot be estimated accurately.

In order to solve the above-described technical problem, the present disclosure is proposed. Embodiments of the present disclosure provide a physical parameter estimating method, a physical parameter estimating device, an electronic apparatus, a computer program product, and a computer-readable storage medium, by which physical parameters of the unit to be measured can be estimated with high accuracy even in presence of noise and obstacles in the interference fringe pattern.

According to one aspect of the present disclosure, there provides a physical parameter estimating method including: reading a Newton's rings fringe pattern obtained by performing an interferometric measurement on a unit to be measured; calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; determining a matched order of the intensity distribution signal according to the calculated magnitude spectrums; and estimating a physical parameter involved in the interferometric measurement according to at least the matched order.

According to another aspect of the present disclosure, there provides a physical parameter estimating method including: reading an interference fringe pattern having a quadratic phase obtained by performing an interferometric measurement on a unit to be measured; calculating a first magnitude spectrum of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; determining a first matched order of the intensity distribution signal of the at least one first-direction pixel set according to the calculated first magnitude spectrums; calculating a second magnitude spectrum of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; determining a second matched order of the intensity distribution signal of the at least one second-direction pixel set according to the calculated second magnitude spectrums; and estimating a physical parameter involved in the interferometric measurement according to at least the first matched order and the second matched order.

According to another aspect of the present disclosure, there provides a fringe pattern reading unit for reading a Newton's rings fringe pattern obtained by performing an interferometric measurement on a unit to be measured; a magnitude spectrum calculating unit for calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; a matched order determining unit for determining a matched order of the intensity distribution signal according to the calculated magnitude spectrums; and a physical parameter estimating unit for estimating a physical parameter involved in the interferometric measurement according to at least the matched order.

According to another aspect of the present disclosure, there provides a physical parameter estimating device including: a fringe pattern reading unit for reading an interference fringe pattern having a quadratic phase obtained by performing an interferometric measurement on a unit to be measured; a first magnitude spectrum calculating unit for calculating a first magnitude spectrum of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; a first matched order determining unit for determining a first matched order of the intensity distribution signal of the at least one first-direction pixel set according to the calculated first magnitude spectrums; a second magnitude spectrum calculating unit for calculating a second magnitude spectrum of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; a second matched order determining unit for determining a second matched order of the intensity distribution signal of the at least one second-direction pixel set according to the calculated second magnitude spectrums; and a physical parameter estimating unit for estimating a physical parameter involved in the interferometric measurement according to at least the first matched order and the second matched order.

According to another aspect of the present disclosure, there provides an electronic apparatus including: a processor; a memory; and computer program instructions stored in the memory that, when executed by the processor, cause the processor to perform the above-described physical parameter estimating method.

According to another aspect of the present disclosure, there provides a computer program product including computer program instructions that, when executed by a processor, cause the processor to execute the above-described physical parameter estimating method.

According to another aspect of the present disclosure, there provides a computer-readable storage medium with computer program instruction stored thereon that, when executed by a processor, cause the processor to perform the above-described physical parameter estimating method.

Compared to conventional methods, by adopting the physical parameter estimating method, the physical parameter estimating device, the electronic apparatus, the computer program product, and the computer-readable storage medium according to the embodiments of the present disclosure, there is no need to perform a denoising operation on the Newton's rings fringe pattern in advance in the procedure of estimation. Due to energy aggregation of chirp signals in the FRFT domain, various physical parameters involved in the interferometric measurement can be estimated simultaneously and with high accuracy even in presence of noise and obstacles in the Newton's rings fringe pattern. Moreover, the procedure of estimation is not influenced by human factors so that artificial errors are reduced.

BRIEF DESCRIPTION OF THE DRAWINGS

The above-described and other purposes, characteristics and advantages would become more apparent by describing embodiments of the present disclosure in more detail in combination with accompanying drawings. The accompanying drawings are intended to provide further understanding of the embodiments of the present disclosure and constitute a part of specification, and to explain the present disclosure together with the embodiments of the present disclosure, instead of constituting limitation to the present disclosure. In the drawings, similar reference numbers generally designate similar elements or steps.

DETAILED DESCRIPTION OF THE PREFERRED EMBODIMENT

Figure 1:
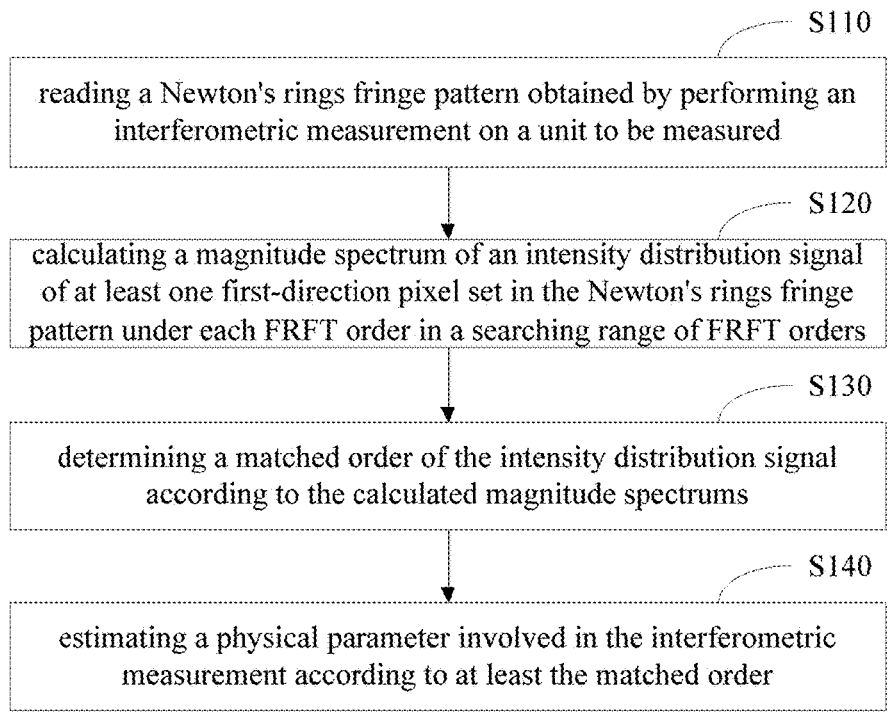
FIG. 1 illustrates a flow chart of a physical parameter estimating method according to a first embodiment of the present disclosure.

Hereinafter, exemplary embodiments according to the present disclosure are described in detail with reference to the accompanying drawings. It is obvious that the described embodiments are only a part of embodiments of the present disclosure but not all of the embodiments of the present disclosure. And, it should be understood that the present disclosure is not limited to the exemplary embodiments described herein.

Overview of the Present Disclosure

As a basic interference fringe pattern, a Newton's rings fringe pattern is often encountered in interferometric measurements. Curvature radius, vertex position, wavelength of incident light, refractive index of media, film thickness, and other physical parameters related to a geometry route of a unit to be measured may be obtained by analyzing and processing the Newton's rings fringe pattern.

A existing and typical method for processing the Newton's rings fringe pattern is the fringe centerline method, and a processing flow thereof includes: reading the Newton's rings fringe pattern; performing pre-processing such as denoising the Newton's rings fringe pattern; performing binarization and thinning on the pre-processed Newton's rings fringe pattern to obtain "skeleton" lines of the original image, i.e., maximum values or minimum values of the fringe intensity; acquiring coordinate values of points on the thinned fringes (i.e., on the fringe centerlines having only a width of one pixel) and deriving radiuses and the center of the fringes by using the theorem that three points can determinate a circle; and finally, calculating curvature radius R of a surface to be measured from radiuses $r_k$ and $r_{k+n}$, of $k^{th}$-order and $(k+m)^{th}$-order dark fringes (where k and m are both natural numbers) and wavelength $\lambda_0$ of incident light by using the following equation (1):

$$R = \frac{r_{k+m}^2 - r_k^2}{m\lambda_0} \quad (1)$$

The existing fringe centerline method has the following disadvantages: the denoising operation must be performed prior to extracting the skeleton lines because this algorithm is very sensitive to influence of noise in the processing procedure and the estimation accuracy significantly relies on the quality of the fringe pattern. When there is a certain amount of noise and obstacles in the Newton's rings fringe pattern, this algorithm cannot estimate the physical parameters of the unit to be measured with relative high accuracy.

In view of the above technical problem, it is found through analysis that, after being simplified, a mathematical expression of an intensity distribution signal of pixels in the Newton's rings fringe pattern has a form similar to that of a two-dimension (2-D) chirp signal. Fractional Fourier transform (FRFT) can be regarded as a generalization of Fourier transform (FT), and understood as a chirp-based decomposition. Accordingly, it is proposed in embodiments of the present disclosure that magnitude spectrums of the intensity distribution signal of the pixels in the Newton's rings fringe pattern are calculated in a FRFT domain, a FRFT matched order of the intensity distribution signal is determined by using energy aggregation of chirp signals in the FRFT domain, and a physical parameter of the unit to be measured is estimated according to the matched order.

In particular, the basic idea of the embodiments of the present disclosure is to provide a new physical parameter estimating method, physical parameter estimating device, electronic apparatus, computer program product, and computer-readable storage medium, in which a magnitude spectrum of an intensity distribution signal of at least one first-direction pixel set in a Newton's rings fringe pattern is calculated under each fractional Fourier transform (FRFT) order in a searching range of FRFT orders in the FRFT domain, the Newton's rings fringe pattern being obtained by performing an interferometric measurement on a unit to be measured; a matched order of the intensity distribution signal of the at least one first-direction pixel set is determined according to the magnitude spectrums calculated under each FRFT order; and a physical parameter involved in the interferometric measurement is estimated according to at least the matched order. Therefore, the FRFT-based physical parameter estimating method according to the embodiments of the present disclosure makes it possible to estimate physical parameters of the unit to be measured with high accuracy even in presence of noise and obstacles in the Newton's rings fringe pattern.

After introducing the basic principle of the present disclosure, various non-restrictive embodiments of the present disclosure will be described in detail with reference to accompanying drawings.

Exemplary Method

FIG. 1 illustrates a flow chart of a physical parameter estimating method according to a first embodiment of the present disclosure.

As shown in FIG. 1, a physical parameter estimating method according to the first embodiment of the present disclosure may include:

In step S110, a Newton's rings fringe pattern obtained by performing an interferometric measurement on a unit to be measured is read.

In step S120, a magnitude spectrum of an intensity distribution signal of at least one first-direction pixel set in the Newton's rings fringe pattern is calculated under each fractional Fourier transform (FRFT) order in a searching range of FRFT orders in a FRFT domain. The first-direction pixel set includes a line of pixels in a first direction, and the first direction is one of a row direction and a column direction of the Newton's rings fringe pattern.

In step S130, a matched order of the intensity distribution signal of the at least one first-direction pixel set is determined according to the magnitude spectrums calculated under each FRFT order.

In step S140, a physical parameter involved in the interferometric measurement is estimated according to at least the matched order.

Thus, it can be seen that, by adopting the physical parameter estimating method according to the first embodiment of the present disclosure, there is no need to perform a denoising operation on the Newton's rings fringe pattern in advance in the procedure of estimation. Due to energy aggregation of chirp signals in the FRFT domain, various physical parameters involved in the interferometric measurement can be estimated simultaneously and with high accuracy even in presence of noise and obstacles in the Newton's rings fringe pattern. Moreover, the procedure of estimation is not influenced by human factors so that artificial errors are reduced.

Hereinafter, the above steps will be described in more detail in some specific examples.

First, in step S110, a Newton's rings fringe pattern obtained by performing an interferometric measurement on a unit to be measured can be acquired in various manners. The Newton's rings fringe pattern includes a series of concentric rings which are sparse on inner side and dense on outer side.

For example, the unit to be measured may be an optical device having a surface to be measured, and the Newton's rings fringe pattern may be generated by measuring the surface of the optical device with a conventional Newton interferometer. It should be appreciated that the present disclosure is not limited thereto. The unit to be measured may be various kinds of devices having parameters to be measured. For example, the unit to be measured may be a metal plate or the like, of which parameters such as deformation, displacement or the like need to be measured.

Figure 2A:
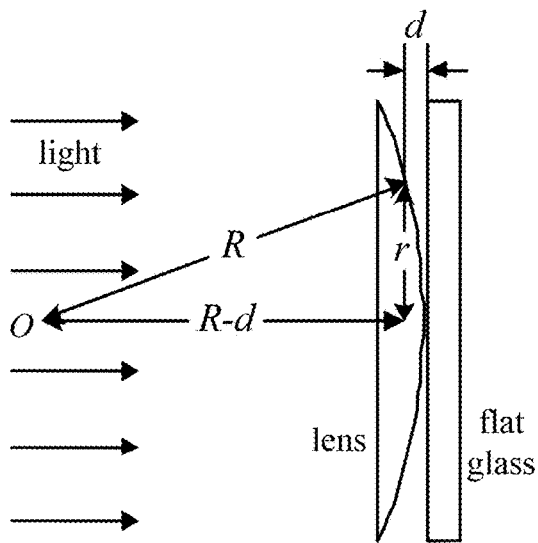
FIG. 2A illustrates a schematic diagram of a core optical path for generating a Newton's rings fringe pattern according to an embodiment of the present disclosure.
Figure 2B:
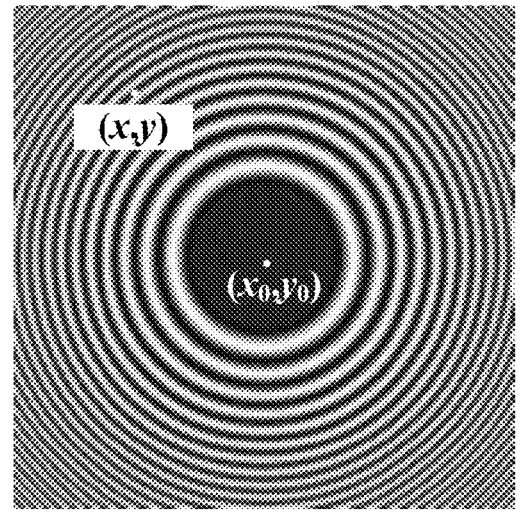
FIG. 2B illustrates a schematic diagram of the Newton's rings fringe pattern according to an embodiment of the present disclosure.

FIG. 2A illustrates a schematic diagram of a core optical path for generating a Newton's rings fringe pattern according to an embodiment of the present disclosure, and FIG. 2B illustrates a schematic diagram of the Newton's rings fringe pattern according to an embodiment of the present disclosure.

As shown in FIG. 2A, an optical device (for example, a plano-convex lens) can be placed on an optical flat glass, and a wedge-shaped gap is formed between a surface of the flat glass and a spherical surface to be measured of the plano-convex lens. The gap is filled with media having a predetermined refractive index $n_0$ (for example, air having the refractive index $n_0$ of 1). When monochrome light of a specific wavelength $\lambda_0$ is irradiated perpendicularly onto the optical device, interferometric fringes can be observed. These fringes are a series of concentric rings centering at the contacting point between the plano-convex lens and the flat glass, i.e., the Newton's rings, as shown in FIG. 2B.

Since diameters of the Newton's rings are too small to be observed and measured directly, a reading microscope can be used. For example, the Newton's rings can be imaged as an object onto an observing screen with a camera lens. This observing screen may be image sensors (for example, complementary metal-oxide semiconductor (CMOS) sensors or the like) on a camera, and each sensor is referred to as a pixel functioning to convert a light signal sensed on its area into an electrical signal. In turn, the electrical signals are converted by a coding circuit into a certain format of digital codes so as to be read into an electronic apparatus such as a computer for subsequent physical parameter estimating processing.

It should be appreciated that the present disclosure is not limited to using the Newton's interferometer to generate the Newton's rings fringe pattern for the unit to be measured. Any known or later-developed methods for generating and reading the Newton's rings fringe pattern can be applied in the physical parameter estimating method according to the embodiments of the present disclosure, and should be included in the protection scope of the present disclosure.

As shown in FIG. 2B, the Newton's rings fringe pattern is a classic example of fringe patterns having a quadratic phase, and the brightness or darkness of each pixel in the fringe pattern is a grayscale value of the fringe intensity. Moreover, it can be proved that the mathematical expression of the intensity distribution signal of the respective pixels in the Newton's rings fringe pattern can be simplified and demonstrated as a 2-D chirp signal. In particular, in the Newton's rings fringe pattern, a mathematical expression $f_N(x,y)$ of an intensity distribution signal at a position of a pixel (x,y) is shown in equation (2):

$$f_N(x, y) = I_0 + I_1\cos(\pi K r^2 + \pi) \qquad (2)$$
$$= I_0 + I_1\cos[\pi K(x - x_0)^2 + \pi K(y - y_0)^2 + \pi]$$
$$= I_0 + I_1\cos[\varphi(x, y)]$$

where $I_0$ is a background intensity of the Newton's rings fringe pattern, $I_1$ is an amplitude of a fringe at the position of the pixel (x,y), K is a chirp rate, $(x_0, y_0)$ are a coordinate set of a center of the Newton's rings fringe pattern, r is a distance between the pixel (x,y) and the pixel $(x_0, y_0)$, and $\varphi(x,y)$ is a phase of the fringe at the position of the pixel (x,y).

Since there is a mapping relationship between the chirp rate K and the physical parameters to be estimated, and since there is also a mapping relationship between the chirp rate K and the FRFT matched order of the chirp signal, the physical parameters of the surface to be measured of the optical device can be estimated by using the FRFT matched order, which may be determined by performing a FRFT on the intensity distribution signal in the Newton's rings fringe pattern.

It can be seen from equation (2) that not only the fringe amplitude $I_1$ and the fringe phase $\varphi(x,y)$ which both form the chirp signal, but also a certain direct current (DC) component $I_0$ exist in the read Newton's rings fringe pattern. The FRFT is a chirp-based decomposition. Therefore, if the FRFT is carried out on the entire Newton's rings fringe pattern directly, there may be some errors in subsequent calculations.

Therefore, in an example of the present disclosure, in order to estimate the physical parameters accurately, the physical parameter estimating method may further include: after step S110, removing a background intensity $I_0$ from the Newton's rings fringe pattern.

The background intensity $I_0$ can be removed with various kinds of methods. For example, the background intensity (or referred to as the DC component) $I_0$ may be derived by determining an intensity value $f_N(x,y)$ of each pixel in the Newton's rings fringe pattern, summing them up and calculating the average value thereof, and then, the background intensity $I_0$ is subtracted at each pixel position in the Newton's rings fringe pattern, so as to implement the removing operation. Of course, the present disclosure is not limited thereto. For example, the above-described removing operation may be implemented by filtering out the DC component at the frequency of 0 Hz using a lowpass filter, an adaptive filter or the like.

In order to estimate physical parameters effectively, in addition to the step of removing the background intensity, the physical parameter estimating method may further include some other pre-processing steps. For example, in an example of the present disclosure, after removing the background intensity from the Newton's rings fringe pattern, the physical parameter estimating method may further include: converting the intensity distribution signal of the at least one first-direction pixel set in the background-intensity-removed Newton's rings fringe pattern from a real number form into a complex number form. Of course, the present disclosure is not limited thereto. Alternatively, in order to achieve a faster processing speed, the FRFT may be carried out in a real number field directly. This may cause some dispersion at places other than the peak of the magnitude spectrum, and thus the dispersion signal and the peak signal need to be distinguished carefully in the subsequent process.

For example, to facilitate subsequent calculation, the intensity distribution signal of a part of pixels (e.g., one or more rows of pixels and/or one or more columns of pixels) or all pixels in the Newton's rings fringe pattern can be converted from the real number distribution to the complex number distribution. The real-to-complex conversion operation can by carried out in various manners. For example, it can be seen from equation (2) that, after removing the DC component $I_0$, the intensity distribution signal of the Newton's rings fringe pattern is a Cosine function, thus, φ(x,y) can be derived simply by using an inverse cosine function a cos( ). Then, the derived φ(x,y) is converted from the real number form into the corresponding complex number form, as expressed in the following equation (3):

$$f_N(x, y) = I_1 \exp[\varphi(x, y)] \quad (3)$$
$$= I_1 \exp[j\pi K(x-x_0)^2 + j\pi K(y-y_0)^2 + j\pi]$$
$$= I_1 \exp(j\pi K r^2 + j\pi)$$

Of course, the present disclosure is not limited thereto. For example, the real-to-complex conversion operation can be implemented by using a Hilbert transform.

Further, it is known according to definition of the FRFT that a range of values of the FRFT order p is 0<|p|<2. In the subsequent FRFT, if the range of values of the FRFT order p is too wide and too dense, the calculation amount may be too high; if the range of values of the FRFT order p is too narrow, the matched order may not be included therein; and if the range of values of the FRFT order p is too sparse, the matched order may have errors.

Therefore, in an embodiment of the present disclosure, in order to make a tradeoff between calculation amount and calculation accuracy of the matched order, the physical parameter estimating method may further include: before step S120, estimating a searching range of FRFT orders. In particular, the step of estimating a searching range of FRFT orders may include: determining ranges of at least some parameters (for example, refractive index $n_0$ of media, wavelength $\lambda_0$ of incident light, and curvature radius R of the surface to be measured of the optical device) among physical parameters involved in the interferometric measurement according to environment and requirement of the interferometric measurement; determining a value range of a FRFT order according to the ranges of the at least some parameters; and dividing the value range with a proper step size to determine the searching range of FRFT orders.

For example, in the scenario as shown in FIG. 2A, typically, the radius of a spherical surface to be measured of a plano-convex lens is between 0.5 m and 2 m, and the refractive index of air is 1, the wavelength of monochrome incident light is constant (for example, the wavelength of red visible light is between 620 nm and 750 nm). A value range of the FRFT order p can be roughly estimated as being between $-4e^{-7}$ to $-1e^{-7}$ by using the above parameter values and the mapping relationship between the physical parameters to be estimated and the matched orders. Further, it can be known from experience that a good accuracy of the matched order can be obtained with a step size of one thousandth of the value range. Thus, 1000 specific values $p_1$ to $p_{1000}$ of the FRFT orders are obtained.

Next, in step S120, a magnitude spectrum of an intensity distribution signal of pixels in the Newton's rings fringe pattern can be calculated under each FRFT order in the searching range of FRFT orders, to determine the FRFT matched order of the intensity distribution signal of the pixels.

It can be found through further analysis of the Newton's rings fringe pattern as shown in FIG. 2B that an intensity distribution signal of pixels in each row or each column of the Newton's rings fringe pattern can be regarded as a one-dimension (1-D) chirp signal. In particular, a mathematical expression of the complex number form of the intensity distribution signal of pixels in each row is shown in equation (4):

$$f_N(x) = I_1 \exp[j\pi K x^2 + j2\pi f_{cen} x + j\varphi_y] \quad (4)$$

and a mathematical expression of the complex number form of the intensity distribution signal of pixels in each column is shown in equation (5):

$$f_N(y) = I_1 \exp[j\pi K y^2 + j2\pi f_{cen} y + j\varphi_x] \quad (5)$$

where $f_{cen}$ is a center frequency, $\varphi_y$ is a fixed phase of a certain row of the Newton's rings fringe pattern, and $\varphi_x$ is a fixed phase of a certain column of the Newton's rings fringe pattern.

It can be seen from equation (4) and equation (5) that pixels in each row and each column of the Newton's rings fringe pattern can be respectively regarded as the 1-D chirp signal and have the same distribution, that is, all of the rows and columns have the same chirp rate K, and thus they have the same matched order or matched rotation angle. In this case, the issue of determining the FRFT matched order of the intensity distribution signal of the respective pixels in the Newton's rings fringe pattern can be simplified as follows: determining the FRFT matched order of an intensity distribution signal of one row or column of pixels in the Newton's rings fringe pattern.

Therefore, in the first example, in order to increase the speed for estimating the physical parameters, step S120 may include: performing a one-dimension (1-D) FRFT on an intensity distribution signal of any one first-direction pixel set under each FRFT order in the searching range of FRFT orders, to obtain a 1-D magnitude spectrum of the intensity distribution signal of the one first-direction pixel set under each FRFT order, the first-direction pixel set includes a line of pixels in a first direction, and the first direction is one of a row direction and a column direction of the Newton's rings fringe pattern.

For example, a first order $p_1$ is selected from the FRFT orders $p_1$ to $p_{1000}$, and the 1-D FRFT of the intensity distribution signal of any one row or column of pixels in the Newton's rings fringe pattern can be derived under this order $p_1$ by using the FRFT equation. Hereinafter, for convenience, an example in which the 1-D FRFT is performed on a row of pixels is described. It is obvious that the present disclosure can be similarly applied to a case of a column of pixels.

In particular, a definition of the FRFT equation is expressed in equation (6):

$$F_\alpha(u) = \int_{-\infty}^{\infty} K_\alpha(u,x) f(x) dx \quad (6)$$

where $f_N(x)$ is an intensity distribution signal of respective pixels in a certain row of the Newton's rings fringe pattern, α is a rotation angle in the time-frequency plane, and $K_\alpha(u,x)$ is a kernel function of the FRFT, which is defined as:

$$K_\alpha(u, x) = \begin{cases} B_\alpha \exp[j\pi(\cot\alpha u^2 - 2\csc\alpha ux + \cot\alpha x^2)], & \alpha \neq n\pi, \\ \delta(u-x), & \alpha = 2n\pi, \\ \delta(u+x), & \alpha = 2n\pi \pm \pi, \end{cases}$$

where $$\alpha = \frac{p}{2}\pi, 0 < |p| < 2, n \in Z,$$

and $B_\alpha = \sqrt{1-j\cot\alpha}$, $B_\alpha$ is a variable related to the rotation angle.

Thus, a first rotation angle $\alpha_1$ can be calculated according to the first order $p_1$. Then, the intensity distribution signal $f_N(i)$ (including 512 elements of $f_N(i,1)$, $f_N(i,2)$, . . . , $f_N(i,512)$) of the i-th row (i is a natural number and $1 \leq i \leq 512$) of pixels in the Newton's rings fringe pattern (for convenience, a resolution thereof is assumed as 512 rows×512 columns) is substituted into equation (6) to calculate the 1-D FRFT under the first rotation angle $\alpha_1$, so as to obtain the 1-D magnitude spectrum of the intensity distribution signal $f_N(i)$ of the i-th row of pixels under the first rotation angle $\alpha_1$. Next, a second rotation angle $\alpha_2$ can be calculated according to the second order $p_2$. Then, the 1-D FRFT of the intensity distribution signal $f_N(i)$ of the i-th row of pixels under the second rotation angle $\alpha_2$ is calculated, to obtain the 1-D magnitude spectrum of the intensity distribution signal $f_N(i)$ of the i-th row of pixels under the second rotation angle $\alpha_2$. These operations are repeated until the 1-D magnitude spectrum of the intensity distribution signal $f_N(i)$ of the i-th row of pixels under the last rotation angle $\alpha_{1000}$ is obtained.

Then, in step S130, after obtaining all of the 1-D magnitude spectrums for a certain row of pixels or a certain column of pixels under each FRFT order, it may be detected whether the row or the column reaches a peak of the 1-D magnitude spectrum after the FRFT. If the peak is reached, it means that the rotation angle is matched with the chirp rate K of the intensity distribution signal of the row/column.

Figure 3:
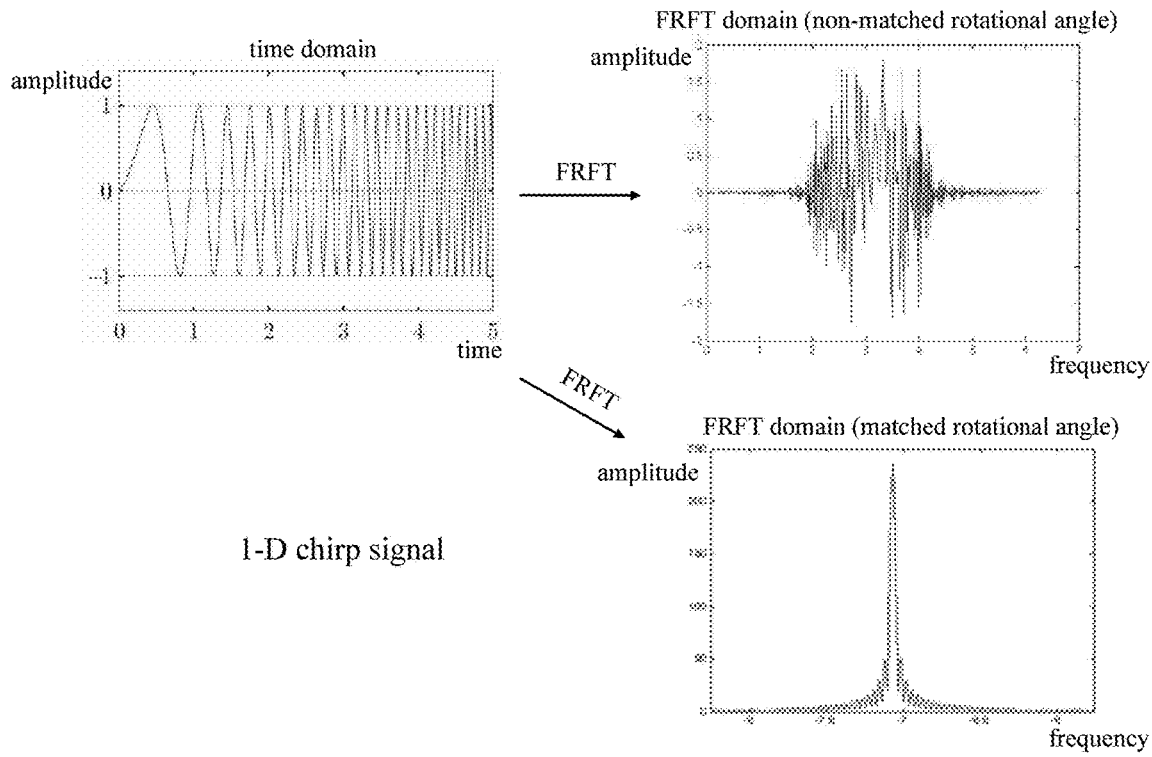
FIG. 3 illustrates a schematic diagram of performing a one-dimension (1-D) fractional Fourier transform (FRFT) on a 1-D chirp signal according to an embodiment of the present disclosure.

FIG. 3 illustrates a schematic diagram of performing a one-dimension (1-D) fractional Fourier transform (FRFT) on a 1-D chirp signal according to an embodiment of the present disclosure.

As shown in FIG. 3, due to the energy aggregation of chirp signals in the FRFT domain, when the FRFT of the 1-D chirp signal is calculated under different FRFT orders p (or rotation angles α), if the FRFT order p is the matched order (or the rotation angle α is the matched rotation angle), a peak with a very high amplitude value appears at a position of a first coordinate in the 1-D magnitude spectrum, as shown in a bottom right diagram in FIG. 3; and if the FRFT order p is not the matched order (or the rotation angle α is not the matched rotation angle), low amplitude values are scatteredly distributed in almost entire FRFT domain, as shown in a top right diagram in FIG. 3.

According to the above characteristic, the step S130 may include: with respect to the one first-direction pixel set, determining a magnitude peak of each of the 1-D magnitude spectrums for the first-direction pixel set; finding a 1-D magnitude spectrum having a maximum magnitude peak among the 1-D magnitude spectrums for the first-direction pixel set; and determining a FRFT order corresponding to the 1-D magnitude spectrum having the maximum magnitude peak as the matched order.

For example, the matched order $p_k$ (k is a natural number and $1 \leq k \leq 1000$) can be obtained by finding a maximum value in 1000 1-D magnitude spectrums of the intensity distribution signal $f_N(i)$ of the i-th row of pixels under all of the FRFT orders $p_1$ to $p_{1000}$.

Since the above operation requires storing a large amount of magnitude values, it needs a massive storage capacity. So, in order to save storage space, only the maximum value of the magnitude spectrums obtained after current comparison and its coordinate in the FRFT domain are stored, and subsequent amplitude values are compared therewith continuously. If the subsequent amplitude value is larger, the maximum value and its coordinate stored are updated, and otherwise, the comparison is continued.

At last, in step S140, after determining the matched order of the intensity distribution signal of the certain row or column of pixels, various physical parameters, such as curvature radius, vertex position, wavelength of incident light, refractive index of media, deformation, displacement, film thickness or the like, of the unit can be obtained based on at least the matched order.

In one example, in case that the unit to be measured is an optical device having a surface to be measured, the step S140 may include: calculating one of three physical parameters used in the interferometric measurement according to the matched order in response to knowing the other two physical parameters, the three physical parameters including a refractive index of media, a wavelength of incident light, and a curvature radius of the surface to be measured.

Specifically, a mapping relationship between the matched rotation angle and the matched order is expressed in equation (7):

$$\alpha = \frac{p}{2}\pi \tag{7}$$

A mapping relationship between the chirp rate K and the matched order of the intensity distribution signal of a certain row or column of pixels is expressed in equation (8):

$$\cot\alpha = \cot\left(\frac{p}{2}\pi\right) = -K \tag{8}$$

A mapping relationship between the chirp rate K and the physical parameters involved in the interferometric measurement is expressed in equation (9):

$$\frac{2\pi n_0}{\lambda_0 R} = \pi K \tag{9}$$

where $n_0$ is the refractive index of media, $\lambda_0$ is the wavelength of incident light, and R is the curvature radius of the surface to be measured of the optical device.

The below equation (10) can be obtained by combining equation (7) to equation (9):

$$R = -\frac{2n_0}{\lambda_0 \cot\alpha} = -\frac{2n_0}{\lambda_0 \cot\left(\frac{p}{2}\pi\right)} \quad (10)$$

Thus, in case that the refractive index of media, the wavelength of incident light, and the matched order (or the matched rotation angle) are known, the curvature radius of the surface can be obtained.

Since the vertex position of the surface to be measured is desired to be obtained in addition to the curvature radius, in another example, the step S140 may include: determining a first coordinate of the maximum magnitude peak in the 1-D FRFT domain; and determining a first-direction coordinate of a center of the Newton's rings fringe pattern according to the matched order and the first coordinate, the first-direction coordinate being a coordinate in the first direction.

In particular, a mapping relationship between the coordinate set of the center of the Newton's rings fringe pattern and the coordinate set of maximum magnitude peak in the 1-D FRFT domain is expressed in equation (11) and equation (12):

$$x_0 = -u_{x0} \frac{\csc\alpha}{K} \quad (11)$$

$$y_0 = -u_{y0} \frac{\csc\alpha}{K} \quad (12)$$

where $u_{x0}$ is a first coordinate of the magnitude peak of the 1-D magnitude spectrum of the intensity distribution signal of a certain row of pixels in the Newton's rings fringe pattern under the matched order, and $u_{y0}$ is a second coordinate of the magnitude peak of the 1-D magnitude spectrum of the intensity distribution signal of a certain column of pixels in the Newton's rings fringe pattern under the matched order.

Since the first coordinate $u_{x0}$ of the magnitude peak of the 1-D magnitude spectrum of the intensity distribution signal of the i-th row of pixels under the matched order is found in step S130, a first-direction coordinate (for example, X-axis coordinate) of the center of the Newton's rings fringe pattern can be obtained according to the equation (11). Then, a first-direction coordinate (for example, X-axis coordinate) of the vertex position of the surface to be measured in a projecting plane can be obtained according to the first-direction coordinate of the center.

In a further example, in order to obtain the entire position coordinates of the center of the Newton's rings fringe pattern, the step S140 may further include: performing the 1-D FRFT on an intensity distribution signal of a second-direction pixel set in the Newton's rings fringe pattern under the matched order, to obtain a 1-D magnitude spectrum for the second-direction pixel set, the second-direction pixel set including a line of pixels in a second direction, the second direction being perpendicular to the first direction; determining a second coordinate of a magnitude peak of the 1-D magnitude spectrum for the second-direction pixel set in the 1-D FRFT domain; and determining a second-direction coordinate of the center of the Newton's rings fringe pattern according to the matched order and the second coordinate, the second-direction coordinate being a coordinate in the second direction.

As described above, since rows and columns in the Newton's rings fringe pattern vary in the same way, that is, the matched rotation angles corresponding to all of the rows and columns are the same, the 1-D magnitude spectrum of the intensity distribution signal $f_N(h)$ of the h-th column (h is a natural number and 1 is a n) of pixels under the matched order $p_k$ can be calculated directly, and the maximum magnitude value and its second coordinate $u_{y0}$ are found in the 1-D magnitude spectrum through comparison, and a second-direction coordinate (for example, Y-axis coordinate) of the center of the Newton's rings fringe pattern is obtained by substituting the second coordinate $u_{y0}$ into equation (12). Then, a second-direction coordinate (for example, Y-axis coordinate) of the vertex position of the surface to be measured in the projecting plane can be obtained according to the second-direction coordinate of the center.

Thus it can be seen that, in the first example of the first embodiment of the present disclosure, in order to obtain a fast physical parameter estimating speed, the matched order can be determined by performing the 1-D FRFT on the intensity distribution signal of any one row or column of pixels respectively under each FRFT order in the searching range of FRFT orders with respect to the one row or column of pixels, and various physical parameters involved in the interferometric measurement can be estimated by using information such as the matched order and the position at which the magnitude peak thereof appears. Thus, a fast physical parameter estimating operation can be achieved.

However, in the first example, when there is noise or obstacles in the selected one row or column of pixels, the 1-D magnitude spectrum obtained based on the row or column of pixels will have errors, and thus an accurate physical parameter estimation may not be obtained.

In order to address the above problem, it is proposed in a second example that 1-D magnitude spectrums and matched orders can be obtained with respect to a plurality of rows or columns of pixels, and a final matched order can be determined based on a mathematical averaging of the obtained matched orders. It can be seen that this can improve estimation accuracy to a certain extent meanwhile ensuring the fast physical parameter estimation.

Therefore, in the second example, in order to balance speed and accuracy of the physical parameter estimation, after reading the Newton's rings fringe pattern in step S110, step S120 may include: with respect to each first-direction pixel set of the plurality of first-direction pixel sets, performing a 1-D FRFT on an intensity distribution signal of the first-direction pixel set respectively under each FRFT order in the searching range of FRFT orders, to obtain a 1-D magnitude spectrum of the intensity distribution signal of the first-direction pixel set under each FRFT order. Correspondingly, the step S130 may include: with respect to each first-direction pixel set of the plurality of first-direction pixel sets, determining a magnitude peak of each of the 1-D magnitude spectrums for the first-direction pixel set; finding a 1-D magnitude spectrum having a maximum magnitude peak among the 1-D magnitude spectrums for the first-direction pixel set; and determining a FRFT order corresponding to the 1-D magnitude spectrum having the maximum magnitude peak as a matched order for the first-direction pixel set; and determining the matched order of the intensity distribution signal by averaging the matched orders for the plurality of first-direction pixel sets.

For example, a plurality of rows or columns of pixels can be selected arbitrarily from the Newton's rings fringe pattern, and operations which are the same as those in step S120 and S130 in the first example are performed with respect to each of the plurality of rows or columns of pixels, to obtain the matched order of each row or column of pixels, and an average value of the matched orders of the plurality of rows or columns of pixels obtained is calculated. Hereinafter, for convenience, an example in which the 1-D FRFT is performed on rows of pixels is described. It is obvious that the present disclosure can be similarly applied to a case of columns of pixels.

Specifically, with respect to a first row of pixels in a set of rows of pixels selected, in step S120, a 1-D magnitude spectrum of the intensity distribution signal of the first row of pixels under all of rotation angles $\alpha_1$ to $\alpha_{1000}$ are obtained; in step S130, the matched order of the first row of pixels is obtained by finding a maximum value of the 1000 1-D magnitude spectrums of the intensity distribution signal of the first row of pixels under all of the FRFT orders $p_1$ to $p_{1000}$. Then, above-described operations are repeated with respect to a second row of pixels in the set of rows of pixels selected, to obtain the matched order of the second row of pixels. The above-described operations are repeated until the matched order of a last row of pixels in the set of rows of pixels selected is obtained. Finally, the matched order of the intensity distribution signals of the set of rows of pixels selected is determined by averaging the matched orders of all of the rows of pixels in the set of rows of pixels.

Next, in step S140, after determining the matched order of the intensity distribution signals of certain several rows or columns of pixels, various physical parameters, such as curvature radius, vertex position, wavelength of incident light, refractive index of media, deformation, displacement, film thickness or the like, of the unit can be obtained based on at least the matched order. Since step S140 is the same as that in the first example, the detailed description thereof is omitted here.

Thus it can be seen that, in the second example of the first embodiment of the present disclosure, in order to balance the speed and the accuracy of the physical parameter estimation, the matched order can be determined by performing the 1-D FRFT on the intensity distribution signals of a plurality of (or all of) rows or columns of pixels respectively under each FRFT order in the searching range of FRFT orders with respect to the plurality of (or all of) rows or columns of pixels, and various physical parameters involved in the interferometric measurement can be estimated by using average value of information such as the plurality of matched orders and the positions at which the magnitude peaks thereof appear. Thus, the accuracy of the physical parameter estimation is improved to a certain extent.

However, in the second example, since the rows or columns of pixels selected are still limited, when there is noise or obstacles in all of the rows or columns of pixels selected (for example, a large area is blocked in the Newton's rings fringe pattern due to stain existing in the optical path during the interferometric measurement), the 1-D magnitude spectrum obtained based on the several rows or columns of pixels will have errors, and thus subsequent physical parameter estimation will still have errors even with mathematical average performed.

In order to address the above problem, it is proposed in the third example that a 2-D magnitude spectrum of the entire Newton's rings fringe pattern can be obtained and the matched order can be derived based on the 2-D magnitude spectrum. This can make the subsequent physical parameter estimation less sensitive to the noise and obstacles in the Newton's rings fringe pattern, and physical parameters can be estimated effectively even when there is a large amount of noise and obstacles in the Newton's rings fringe pattern.

Therefore, in the third example, in order to further improve the accuracy of the physical parameter estimation, after reading the Newton's rings fringe pattern in step S110, step S120 may include: performing a two-dimension (2-D) FRFT on the intensity distribution signals of all of the first-direction pixel sets respectively under each FRFT order in the searching range of FRFT orders, to obtain a 2-D magnitude spectrum of the intensity distribution signals of all of the first-direction pixel sets under each FRFT order.

Specifically, due to separability of the 2-D FRFT kernel function, performing the 2-D FRFT on a Newton's rings fringe pattern includes performing a 1-D FRFT on rows of pixels (or row vectors) in the Newton's rings fringe pattern and then performing the 1-D FRFT on column vectors of an intermediate result image generated by the first 1-D FRFT transform; or on the contrary, performing a 1-D FRFT on columns of pixels (or column vectors) in the Newton's rings fringe pattern and then performing the 1-D FRFT on row vectors of an intermediate result image generated by the first 1-D FRFT transform. Hereinafter, the 2-D FRFT is described in detail in one example.

Figure 4:
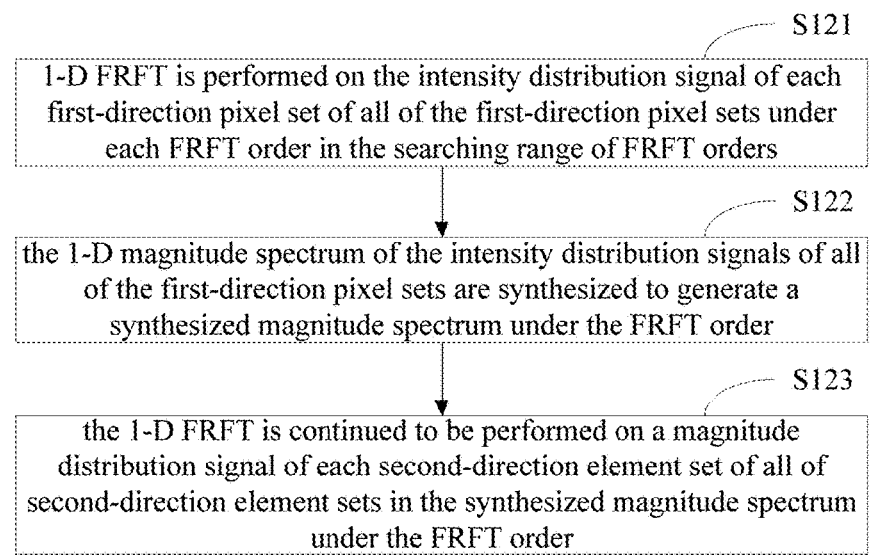
FIG. 4 illustrates a flow chart of a step of performing a two-dimension (2-D) FRFT on intensity distribution signals of all of first-direction pixel sets according to an embodiment of the present disclosure.

FIG. 4 illustrates a flow chart of a step of performing a two-dimension (2-D) FRFT on intensity distribution signals of all of first-direction pixel sets according to an embodiment of the present disclosure.

As shown in FIG. 4, step S120 may include:

In sub-step S121, a one-dimension (1-D) FRFT is performed on the intensity distribution signal of each first-direction pixel set of all of the first-direction pixel sets under each FRFT order in the searching range of FRFT orders, to obtain a 1-D magnitude spectrum of the intensity distribution signal of the first-direction pixel set under the FRFT order.

For example, a first order $p_1$ is selected from the FRFT orders $p_1$ to $p_{1000}$, and a first rotation angle $\alpha_1$ is calculated according to the first order $p_1$, and the 1-D FRFT of the intensity distribution signal of each row or column of pixels in the Newton's rings fringe pattern under the rotation angle $\alpha_1$ is derived by using the FRFT equation. Hereinafter, for convenience, an example in which the 1-D FRFT is firstly performed on rows of pixels is described. It is obvious that the present disclosure can be similarly applied to a case in which the 1-D FRFT is firstly performed on columns of pixels.

For example, first, the 1-D FRFT of the intensity distribution signal of the first row of pixels under the rotation angle $\alpha_1$ is calculated, to obtain the 1-D magnitude spectrum of the intensity distribution signal of the first row of pixels under the rotation angle $\alpha_1$. Then, the 1-D FRFT of the intensity distribution signal of the second row of pixels under the rotation angle $\alpha_1$ is calculated, to obtain the 1-D magnitude spectrum of the intensity distribution signal of the second row of pixels under the rotation angle $\alpha_1$. The above-described operations are repeated until the 1-D magnitude spectrum of the intensity distribution signal of the last row of pixels under the rotation angle $\alpha_1$ is obtained. For example, the magnitude spectrum of the intensity distribution signal of a certain row of pixels in the Newton's rings fringe pattern in the 1-D FRFT domain is shown on the right side of FIG. 3 (top and bottom figures correspond to cases of unmatching and matching respectively)

In sub-step S122, the 1-D magnitude spectrum of the intensity distribution signals of all of the first-direction pixel sets are synthesized to generate a synthesized magnitude spectrum under the FRFT order.

For example, the 1-D magnitude spectrums of each row of pixels under the rotation angle $\alpha_1$ are put together in order of rows of pixels to form an image of the 2-D magnitude spectrum as the synthesized magnitude spectrum.

In sub-step S123, the 1-D FRFT is continued to be performed on a magnitude distribution signal of each second-direction element set of all of second-direction element sets in the synthesized magnitude spectrum respectively under the FRFT order, to obtain the 2-D magnitude spectrum of the intensity distribution signals of all of the first-direction pixel sets under the FRFT order. The second-direction element set includes a line of elements in a second direction, and the second direction is perpendicular to the first direction.

For example, the 1-D FRFT may be performed once again on column vectors in the intermediate result image obtained in the sub-step S122 under the rotation angle $\alpha_1$, to achieve the 2-D FRFT of the Newton's rings fringe pattern under the rotation angle $\alpha_1$.

Next, a second order $p_2$ is selected, and a second rotation angle $\alpha_2$ is calculated according to the second order $p_2$, and then the above sub-steps S121 to S123 are repeated to obtain the 2-D FRFT of the Newton's rings fringe pattern under the rotation angle $\alpha_2$. The above-described operations are repeated until the 2-D FRFT of the Newton's rings fringe pattern under the rotation angle $\alpha_{1000}$ is obtained.

In the third example, next, step S130 may include: determining a magnitude peak of each of the 2-D magnitude spectrums for all of the first-direction pixel sets; finding a 2-D magnitude spectrum having a maximum magnitude peak among the 2-D magnitude spectrums for all of the first-direction pixel sets; and determining a FRFT order corresponding to the 2-D magnitude spectrum having the maximum magnitude peak as the matched order.

In other words, after obtaining all of the 2-D magnitude spectrums of the entire Newton's rings fringe pattern under each FRFT order, it may be detected whether the Newton's rings fringe pattern reaches a peak of the 2-D magnitude spectrum after FRFT. If the peak is reached, it means that the rotation angle is matched with the chirp rate K of the intensity distribution signals of the Newton's rings fringe pattern.

Figure 5:
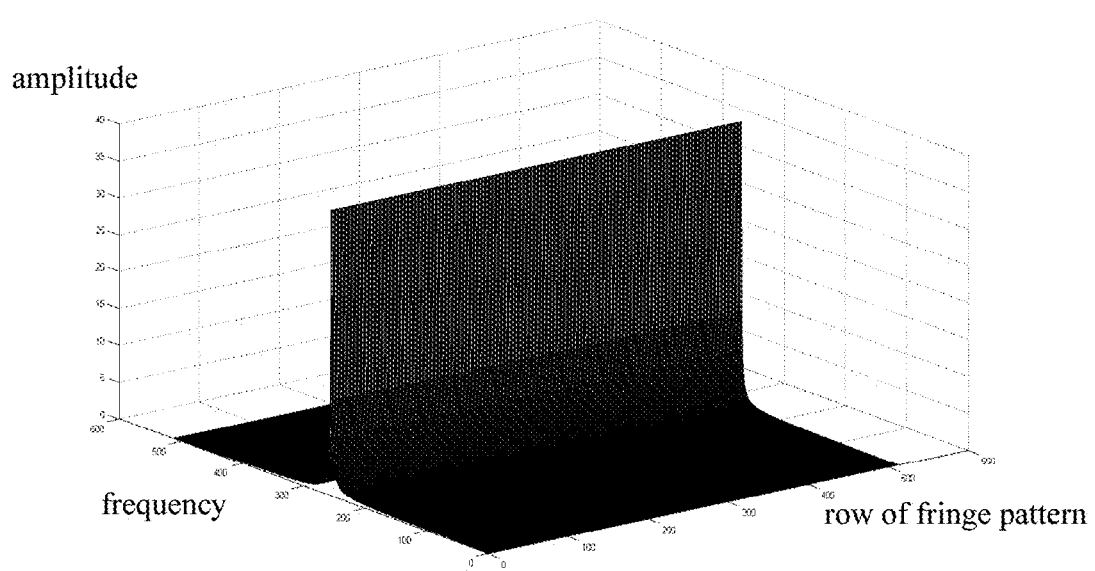
FIG. 5 illustrates a schematic diagram of a synthesized magnitude spectrum of all rows of pixels in the Newton's rings fringe pattern under a FRFT matched order according to an embodiment of the present disclosure.

FIG. 5 illustrates a schematic diagram of a synthesized magnitude spectrum of all rows of pixels in the Newton's rings fringe pattern under a FRFT matched order according to an embodiment of the present disclosure.

As shown in FIG. 5, in the image of the 2-D magnitude spectrum subjected to the 1-D FRFT once under the matched order, a series of sinc signals appear. It is equivalent to a 2-D magnitude spectrum obtained by combining the 1-D magnitude spectrums under the matched rotation angle as shown in FIG. 3 in order of rows of pixels. In the 2-D magnitude spectrum, horizontal axis shows numbers of the rows of pixels in the Newton's rings fringe pattern, and vertical axis shows coordinates of the FRFT domain. In order to facilitate the subsequent FRFT and the parameter estimation, coordinates of the FRFT domain in the 2-D magnitude spectrum may be divided to make the coordinates equal to the number of the columns of pixels in the fringe pattern.

Figure 6A:
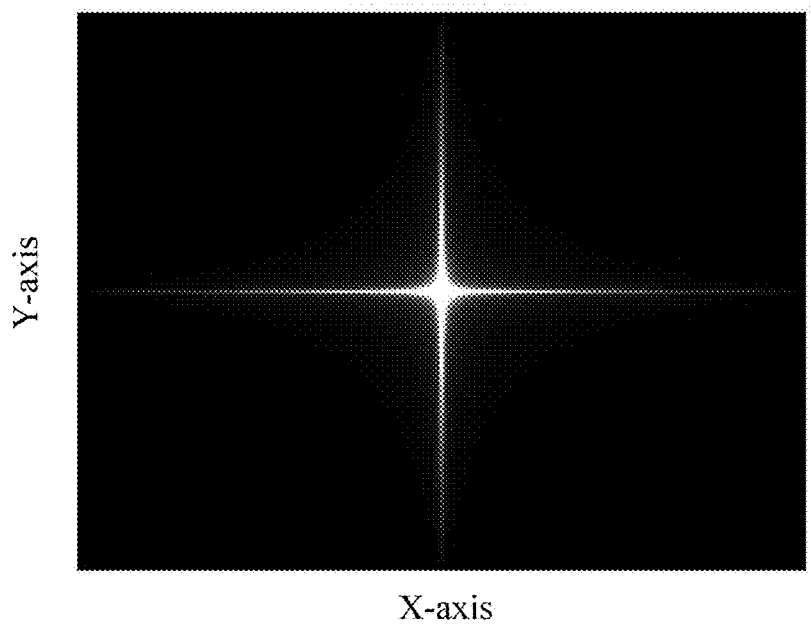
FIG. 6A illustrates a two-dimension (2-D) schematic diagram of a 2-D magnitude spectrum of the Newton's rings fringe pattern under a FRFT matched order according to an embodiment of the present disclosure.
Figure 6B:
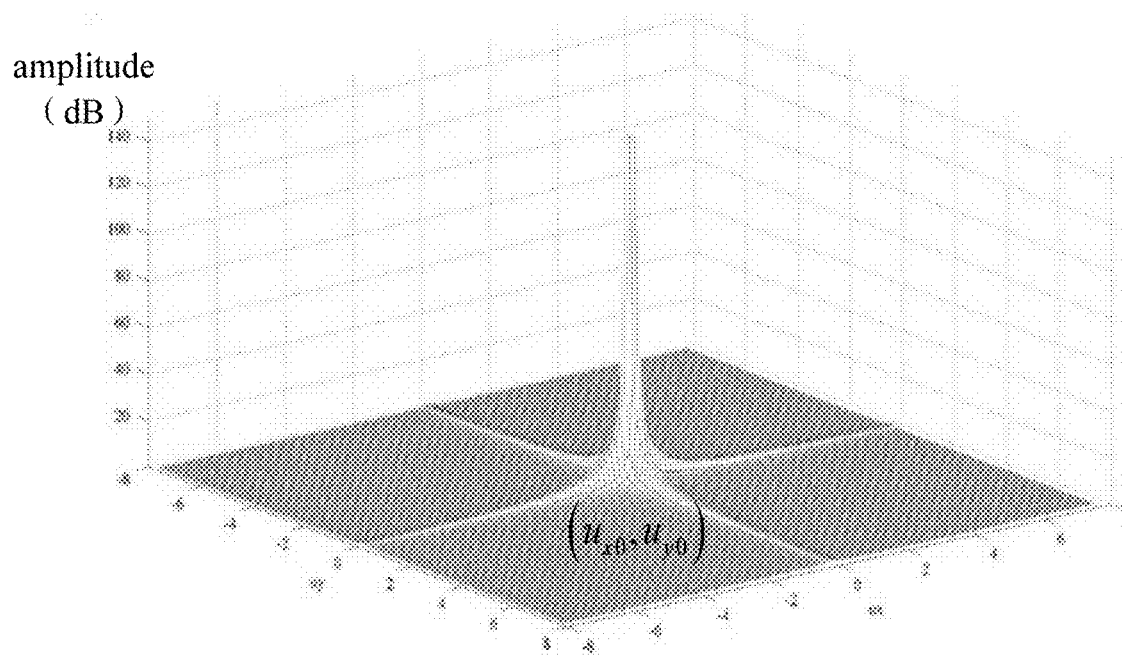
FIG. 6B illustrates a three-dimensional (3-D) schematic diagram of the 2-D magnitude spectrum of the Newton's rings fringe pattern under the FRFT matched order according to an embodiment of the present disclosure.

FIG. 6A illustrates a two-dimension (2-D) schematic diagram of a 2-D magnitude spectrum of the Newton's rings fringe pattern under a FRFT matched order according to an embodiment of the present disclosure, and FIG. 6B illustrates a three-dimensional (3-D) schematic diagram of the 2-D magnitude spectrum of the Newton's rings fringe pattern under the FRFT matched order according to an embodiment of the present disclosure.

As shown in FIG. 6A, it can be seen from a 2-D view that the center of the 2-D magnitude spectrum is the brightest, which corresponds to a signal with the maximum amplitude, and then the brightness gradually fades out towards periphery thereof along X-axis and Y-axis, which constitutes a 2-D sinc envelope. As shown in FIG. 6B, when this final result image is observed from 3-D view, it can be seen that the matched rotation angle is obtained when the maximum peak signal appears, that is, when the 2-D peak signal (i.e., 2-D sine signal) is detected, and the result is in line with expectation.

In the third example, in the next step S140, similarly to that of the first example, in response to knowing two of three physical parameters used in the interferometric measurement including the refractive index of media, the wavelength of incident light, and the curvature radius of the surface to be measured of the optical device, the other one is calculated according to the matched order.

For example, after the matched order of the intensity distribution signals of the Newton's rings fringe pattern is determined, the curvature radius of the surface to be measured of the optical device can be obtained through equation (10) in case that the refractive index of media, the wavelength of incident light, and the matched rotation angle are known.

Further, unlike the first example, a coordinate set (i.e., 2-D coordinates) of the center of the Newton's rings fringe pattern can be calculated directly from the coordinate set (i.e., 2-D coordinates) of position at which a maximum FRFT amplitude value under the matched rotation angle appears.

In this case, step S140 may include: determining a coordinate set of the maximum magnitude peak in a 2-D FRFT domain; and determining a coordinate set of a center of the Newton's rings fringe pattern according to the matched order and the coordinate set, the coordinate set of the center including a coordinate in the first direction and a coordinate in the second direction.

For example, under the matched rotation angle, the FRFT of each row/column is a peak signal, i.e., 1-D sine signal. For the Newton's rings fringe pattern, coordinates $(x_0, y_0)$ of the center of the Newton's rings fringe pattern can be calculated according to equations (11) and (12) from the position $(u_{x0}, u_{y0})$ at which the magnitude peak appears, so as to achieve estimation of the coordinates of the center of the Newton's rings fringe pattern.

Thus it can be seen that, in the third example of the first embodiment of the present disclosure, in order to improve estimation accuracy of the physical parameters, the matched order can be determined by performing the 2-D FRFT on the intensity distribution signals of the entire Newton's rings fringe pattern respectively under each FRFT order in the searching range of FRFT orders, and various physical parameters involved in the interferometric measurement can be estimated by using information such as the matched order and the position at which the magnitude peak thereof appears. Thus, by determining the matched order based on the entire Newton's rings fringe pattern, the procedure of the physical parameter estimation are not sensitive to local noise and obstacles in the Newton's rings fringe pattern, and relatively accurate physical parameters can be estimated effectively even when the fringe pattern is blocked somewhere or even when the center of the Newton's rings is not on the fringe pattern.

It is found through experiments that when the Newton's rings fringe pattern is analyzed, the method in the third example has the following advantages:

1. When there is noise in the Newton's rings fringe pattern and the Signal-to-Noise Ratio (SNR)≥0 dB, a relative error of the curvature radius estimated in the present disclosure is found to be approximately 0.22%, and the estimated position of a central pixel of the Newton's rings only has a deviation of only 2 pixels. When the SNR is lowers to −10 dB, the relative error of the estimated curvature radius is 1.3%, and the deviation of the estimated position is the same.

2. When the Newton's rings fringe pattern is blocked by obstacles and the blocked area is at the center of the Newton's rings fringe pattern, the relative error of the curvature radius estimated in the present disclosure is 0.22%, and the estimated position of the central pixel of the Newton's rings has a deviation of only 2 pixels. When the blocked area is at other positions, the relative error of the estimated curvature radius is 0.41%, and the deviation of the estimated position is the same.

Therefore, it can be seen that in the third example, since the accuracy of algorithms adopted in steps S110 to S140 has a certain limitation per se, a very small amount of errors may still exist in the estimated physical parameters.

In order to address the above problem, after step S140, the physical parameter estimating method may further include: performing an error correction on the estimated physical parameters.

Apparently, in different embodiments of the present disclosure, various kinds of error correction methods can be adopted to conduct some fine adjustment to the estimated physical parameters. In one example, the error correction can be performed by using a least square fitting method.

In this case, the step of error correction may include: correcting the estimated physical parameter using an intensity distribution model of the Newton's rings fringe pattern and pixel intensity values in the Newton's rings fringe pattern by taking the estimated physical parameter as an initial value for a least square fitting method.

The idea of correcting the physical parameters by using the least square fitting method is that: given a set of estimated physical parameters, intensity distribution of the fringe pattern can be calculated through mathematical expression form of the Newton's rings fringe pattern, a difference between the calculated intensity distribution and the intensity distribution of the Newton's rings fringe pattern to be analyzed is calculated, and the physical parameters corresponding to a minimum value of the squared difference will be the corrected physical parameters.

In one example, obtaining the minimum value of the squared difference can derive the corrected physical parameters by taking a derivative of the difference function with respect to the physical parameters and letting the derivative to be equal to zero.

For example, the intensity distribution of the Newton's rings fringe pattern as expressed in equation (2) can be further described by using the following mathematical function as expressed in equation (13):

$$f_N(x, y; A) = f_N(x, y) \quad (13)$$
$$= I_0 + I_1 \cos(\pi K r^2 + \pi)$$
$$= I_0 + I_1 \cos[\pi K(x-x_0)^2 + \pi K(y-y_0)^2 + \pi]$$
$$= a_1 + a_1 \cos[a_2(x-a_3)^2 + a_2(y-a_4)^2 + a_5]$$

where since the background intensity $I_0$ and the fringe amplitude $I_1$ in the Newton's rings fringe pattern are approximately the same, $I_0$ and $I_1$ can be expressed collectively by $a_1$, that is, $(a_1,a_2,a_3,a_4,a_5)$ is a simplified symbol description of $(I_0$ and $I_1,K,x_0y_0,\pi)$ respectively. It is to be appreciated that although $a_1$ is $\pi$ in the Newton's rings fringe pattern obtained when measuring the plano-convex lens, $a_5$ may not be $\pi$ but a variable in other Newton's rings fringe pattern obtained when measuring other unit to be measured, and thus it may still need to be corrected. It can be seen from equation (13) that intensity distribution $f_N(x,y; A)$ at the each pixel position (x,y) can be derived once values of coefficients $(a_1,a_2,a_3,a_4,a_5)$ are known. In order to facilitate description, the coefficients $(a_1,a_2,a_3,a_4,a_5)$ are expressed collectively by an overall coefficient A in equation (13), and then $f_N(x,y)$ is expressed by $f_N(x,y;A)$. This expression can show a relationship between the intensity distribution $f_N(x,y)$ and the coefficient A more intuitively.

As mentioned above, the essence of the least square fitting method is to derive the coefficient A so as to minimize a square of a difference between a fringe distribution expressed by this coefficient and the actual fringe distribution, as expressed by equation (14):

$$\min_A \chi^2(A) = \min_A \|f_N(A, X) - Y\|_2^2 = \min_A \sum_i (f_N(A, X_i) - Y_i)^2 \quad (14)$$

where the coefficient A can be obtained by taking a derivative of the function $\chi^2(A)=\|f_N(A,x)-Y\|^2_2$ with respect to the coefficient A and letting the derivative to be zero.

However, since the expression of equation (13) is complex, in another example, $f_N(x,y;A)$ is first Taylor expanded, for example first-order Taylor expanded, at an initial value A0 (A0 represents the coefficients estimated by the FRFT in the step S110 to S140, i.e., five coefficients to be corrected. That is, like A, A0 includes five parameters). The form of the Taylor expansion is expressed in equation (15):

$$f_N(x, y; A) = f_N(x, y; A_0) + \frac{\partial f_N(x, y; A_0)}{\partial A} \cdot (A - A_0) \quad (15)$$
$$= f_N(x, y; A_0) + \frac{\partial f_N(x, y; A_0)}{\partial A} \cdot \varepsilon(A)$$

Then, a difference between $f_N(x,y;A)$ and the intensity distribution Y of the fringe pattern to be processed is calculated, and the square of the difference is obtained, as expressed in equation (16):

$$\chi^2(A) = \|f_N(x, y; A) - Y\|_2^2 \quad (16)$$
$$= \left\| f_N(x, y; A_0) + \frac{\partial f_N(x, y; A_0)}{\partial A} \cdot (A - A_0) - Y \right\|_2^2$$
$$= \left\| f_N(x, y; A_0) - Y + \frac{\partial f_N(x, y; A_0)}{\partial A} \cdot \varepsilon_A \right\|_2^2$$
$$= \left\| S_0 + \frac{\partial f_N(x, y; A_0)}{\partial A} \cdot \varepsilon_A \right\|_2^2$$

where $\varepsilon_A=A-A_0$, and the item $S_0=f_N(x,y;A_0)-Y$ is a constant (this is because A0 is known, then $f_N(x,y;A_0)$ is known, and Y is also known), and $$\frac{\partial f_N(x, y; A_0)}{\partial A}$$

is also a constant.

Next, it can be known from equation (16) that $\chi^2(A)$ is a function of $\varepsilon_A$. Thus, A minimum value of $\chi^2(A)$ can be derived simply by taking a derivative of the function $\chi^2(A)$ with respect to $\varepsilon_A$ (that is, considering the $\varepsilon_A$ as an unknown number) and letting the derivative to be 0 to derive $\varepsilon_A$. And since $\varepsilon_A = A - A_0$ and $A_0$ is known, the corrected coefficient A can be obtained.

Further, in the fourth example, the coefficient A obtained above can be re-used as a new initial value A0, and the above steps can be repeated to obtain a re-corrected coefficient A. And so forth, multiple corrections can be conducted iteratively until a difference between the newly obtained A and the previous A0 is less than or equal to a threshold.

In the fourth example, after the above error correction, when there is noise in the Newton's rings fringe pattern, the relative error of the curvature radius estimated by the present disclosure is further reduced as compared to the third example, and the deviation of the estimated pixel position of the center of the Newton's rings may be reduced to zero.

Thus it can be seen that, in the fourth example of the first embodiment of the present disclosure, on the basis of the first to the third examples, by utilizing the characteristic that the error correction method only depends on the initial value, correction may be performed by taking value of the estimation provided by the FRFT as an initial value, thereby improving the accuracy of the physical parameter estimation sufficiently. In particular, the pixel position of the center of the Newton's rings is improved most. Moreover, a complex design of optical path is avoided in practical applications, and artificial errors are reduced.

In the first embodiment, the physical parameter estimating method according to the embodiments of the present disclosure is described by taking the Newton's rings fringe pattern as an example. However, the present disclosure is not limited thereto. For example, the physical parameter estimating method can also be applied to other interference fringe patterns having a quadratic phase, to estimate related physical parameters in the interferometric measurement based on the interference fringe patterns. Hereinafter, this is described in the second embodiment.

Figure 7:
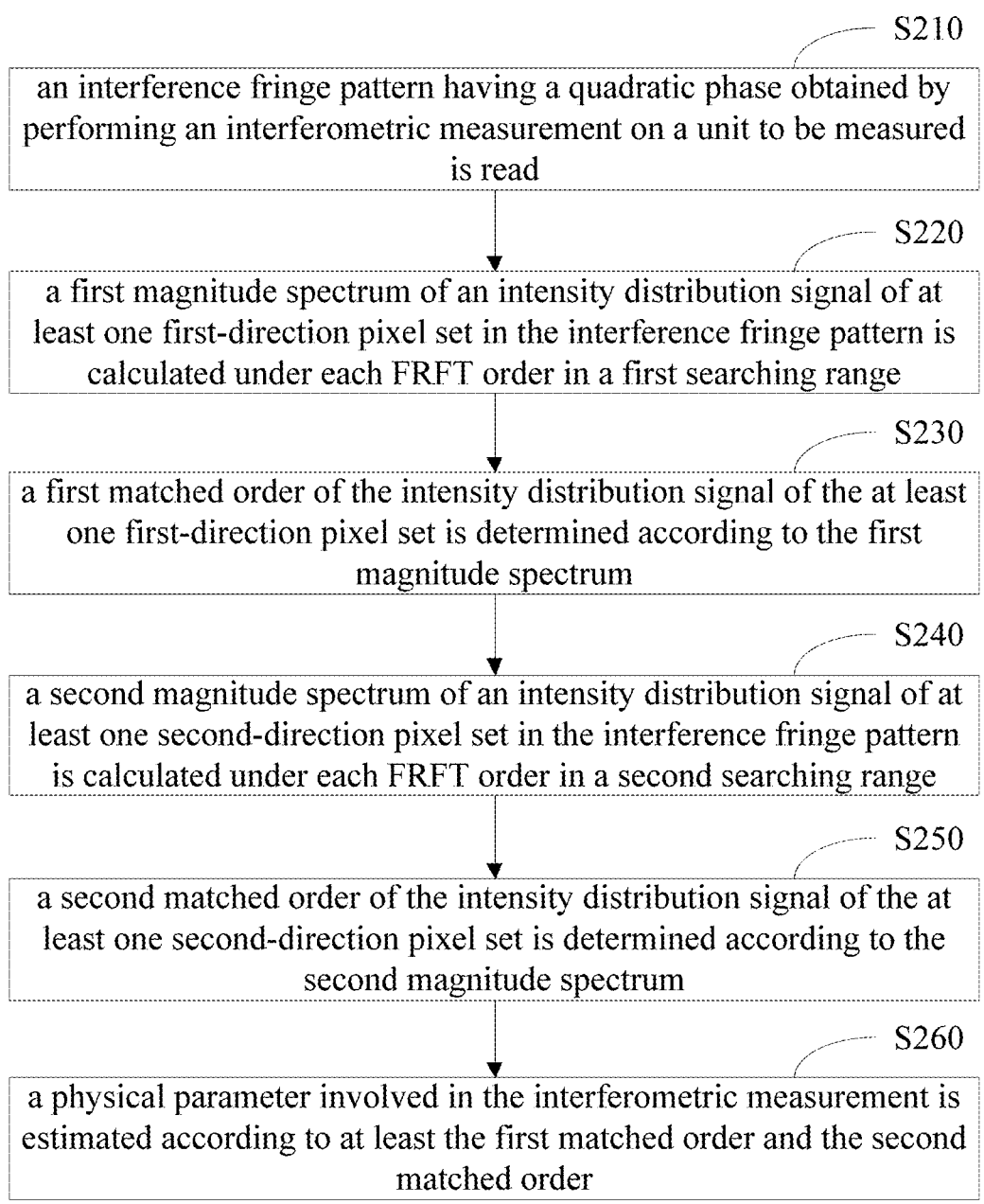
FIG. 7 illustrates a flow chart of a physical parameter estimating method according to a second embodiment of the present disclosure.

FIG. 7 illustrates a flow chart of a physical parameter estimating method according to a second embodiment of the present disclosure.

As shown in FIG. 7, a physical parameter estimating method according to the second embodiment of the present disclosure may include:

In step S210, an interference fringe pattern having a quadratic phase obtained by performing an interferometric measurement on a unit to be measured is read.

Figure 8A:
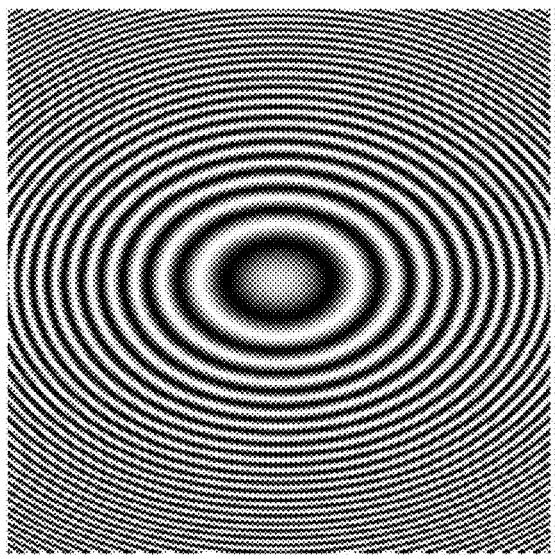
FIGS. 8A and 8B illustrate schematic diagrams of two example interference fringe patterns each having a quadratic phase according to an embodiment of the present disclosure, respectively.
Figure 8B:
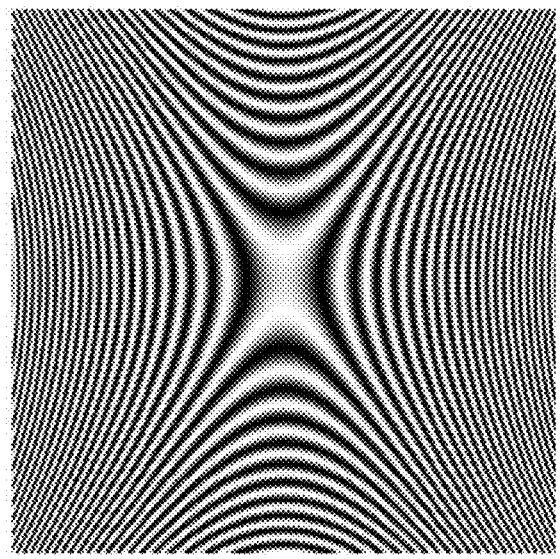

FIGS. 8A and 8B illustrate schematic diagrams of two example interference fringe patterns each having a quadratic phase according to an embodiment of the present disclosure, respectively.

A closed electronic speckle interference (ESPI) fringe pattern is shown in FIG. 8A, and an unclosed ESPI fringe pattern is shown in FIG. 8B. The ESPI technique is to use a laser speckle pattern as an information carrier of field variation of an object to be measured, so as to detect a phase change of the speckle patterns of dual laser beams by using interference-speckle-field-related interference fringes generated by irradiating a laser light onto the object to be measured. For example, a laser beam is diffused by lens and projected onto a surface of the object to be measured, and a reflected light has interference with a reference light beam projected from a laser directly to a camera, so as to generate a speckle field and a series of speckle images at the irradi-ated surface. The ESPI nondestructive detecting technique can implement various kinds of measurements such as displacement, strain, surface defect, and crack.

Of course, the present disclosure is not limited thereto, but may also be applied to other interference fringe patterns having the quadratic phase, for example, the above-described Newton's rings fringe patterns, holographic interference fringe patterns, or the like.

Like the Newton's rings fringe pattern, it is proved that, after being simplified, a mathematical expression of an intensity distribution signal of respective pixels in other fringe patterns having a quadratic phase also has a form similar to the 2-D chirp signal. A mathematical expression $f_N(x,y)$ of an intensity distribution signal at a position of a pixel (x,y) is shown in equation (17):

$$f_N(x,y) = I_0 + I_1 \cos(2\pi f_{cen1} x + \pi K_1 x^2 + \varphi_1 + 2\pi f_{cen2} y + \pi K_2 y^2 + \varphi_2) \quad (17)$$

where $I_0$ is a background intensity of the fringe pattern, $I_1$ is an amplitude of the fringe pattern, $f_{cen1}$ is a center frequency in x-direction in the fringe pattern, $K_1$ is a chirp rate in the x-direction, $\varphi_1$ is a phase of the fringe pattern in the x-direction, $f_{cen2}$ is a center frequency in y-direction in the fringe pattern, $K_2$ is a chirp rate in the y-direction, and $\varphi_2$ is a phase of the fringe pattern in the y-direction.

Thus, it can be seen that, unlike the Newton's rings fringe pattern, pixels in each row or each column of in a general interference fringe pattern having the quadratic phase have different distribution, that is, the chirp rate $K_1$ and phase $\varphi_1$ of all rows are different from the chirp rate $K_2$ and phase $\varphi_2$ of all columns. Thus, calculation needs to be conducted for rows and columns respectively.

In step S220, a first magnitude spectrum of an intensity distribution signal of at least one first-direction pixel set in the interference fringe pattern is calculated under each fractional Fourier transform (FRFT) order in a first searching range of FRFT orders. The first-direction pixel set includes a line of pixels in a first direction, and the first direction is one of a row direction and a column direction of the interference fringe pattern.

In step S230, a first matched order of the intensity distribution signal of the at least one first-direction pixel set is determined according to the first magnitude spectrum calculated under each FRFT order in the first searching range of FRFT orders.

For example, a 1-D FRFT is performed on an intensity distribution signal of one of rows of pixels and columns of pixels under each FRFT order in the searching range of FRFT orders, to obtain a 1-D magnitude spectrum of the intensity distribution signal of one of the rows of pixels and the columns of pixels under the FRFT order respectively. After obtaining all of the 1-D magnitude spectrums of the intensity distribution signal of one of the rows of pixels and the columns of pixels under each FRFT order respectively, it may be detected whether one of the rows of pixels and the columns of pixels reaches a peak of the 1-D magnitude spectrum after the FRFT. If the peak is reached, it means that the rotation angle is matched with the chirp rate K of the intensity distribution signal of one of the rows of pixels and the columns of pixels, thus the first matched order is obtained.

Since the steps S220 and S230 in the second embodiment are the same as the steps S120 and S130 in the first example and the second example of the first embodiment, the detailed description thereof is omitted here.

In step S240, a second magnitude spectrum of an intensity distribution signal of at least one second-direction pixel set in the interference fringe pattern is calculated under each FRFT order in a second searching range of FRFT orders. The second-direction pixel set includes a line of pixels in a second direction, and the second direction is perpendicular to the first direction.

In step S250, a second matched order of the intensity distribution signal of the at least one second-direction pixel set is determined according to the second magnitude spectrum calculated under each FRFT order in the second searching range of FRFT orders.

Similarly, for example, a 1-D FRFT is performed on an intensity distribution signal of the other of rows of pixels and columns of pixels under each FRFT order in the searching range of FRFT orders, to obtain a 1-D magnitude spectrum of the intensity distribution signal of the other of the rows of pixels and the columns of pixels under the FRFT order respectively. After obtaining all of the 1-D magnitude spectrums of the intensity distribution signal of the other of the rows of pixels and the columns of pixels under each FRFT order respectively, it may be detected whether the other of the rows of pixels and the columns of pixels reaches a peak of the 1-D magnitude spectrum after the FRFT. If the peak is reached, it means that the rotation angle is matched with the chirp rate K of the intensity distribution signal of the other of the rows of pixels and the columns of pixels, thus the second matched order is obtained.

Since the steps S240 and S250 in the second embodiment are the same as the steps S120 and S130 in the first example and the second example of the first embodiment, the detailed description thereof is omitted here.

In step S260, a physical parameter involved in the interferometric measurement is estimated according to at least the first matched order and the second matched order.

For example, the step S260 in the second embodiment is the same as the step S140 in the first embodiment, the detailed description thereof is omitted here. For example, after determining the matched orders of the intensity distribution signals of the rows of pixels and the columns of pixels, various physical parameters, such as deformation, displacement in x-direction and y-direction, of the unit to be measured can be obtained based on at least the matched order respectively.

Thus it can be seen that, by adopting the physical parameter estimating method according to the second embodiment of the present disclosure, the interference fringe pattern having the quadratic phase can be further processed on the basis of processing the Newton's rings fringe pattern, so that various physical parameters involved in the interferometric measurement can be estimated with high accuracy and simultaneously even in presence of noise and obstacles in the interference fringe pattern. And, the procedure of estimation is not influenced by the human factors so that artificial errors are reduced.

It is to be appreciated that, although the present disclosure is described by taking the interference fringe pattern having the quadratic phase as an example in the above two embodiments, the present disclosure is not limited thereto, and the present disclosure can also be applied to interference fringe patterns having other complex phase, as long as the interference fringe pattern can be piecewise-approximated as an interference fringe pattern having a quadratic phase.

Therefore, in one example of the embodiment, before the step S210, the physical parameter estimating method may also include: receiving an interference fringe pattern having a complex phase higher than the quadratic phase obtained by performing the interferometric measurement on the unit to be measured; and piecewise-approximating the interference fringe pattern having the complex phase into a plurality of interference fringe patterns having the quadratic phase.

Further, in a further example, after the step S260, the physical parameter estimating method may also include: synthesizing the physical parameters estimated with respect to each of the plurality of interference fringe patterns having the quadratic phase to generate a synthesized physical parameter.

For example, a surface shape of the unit to be measured can be obtained by synthesizing various physical parameters of the unit in the x-direction and y-direction.

Exemplary Application Scenario

The physical parameter estimating method according to various embodiments of the present disclosure can be applied in various kinds of scenarios. For example, it can be applied in teaching experiments or engineering measurements to estimate physical parameters of various kinds of units to be measured. Still further, in the latter scenario, it can be further evaluated whether the unit to be measured conforms to its standard requirement based on the estimated physical parameters.

Therefore, in the present disclosure, for example, after the step S140 of the first embodiment, or after the step S260 of the second embodiment, the physical parameter estimating method may also include: comparing the estimated physical parameter with a reference physical parameter to determine a difference therebetween; deciding whether the difference is larger than or equal to a predetermined threshold; and determining that the unit to be measured does not conform to a specification for the unit in response to the difference being larger than or equal to the predetermined threshold; otherwise, determining that the unit to be measured conforms to the specification for the unit.

Hereinafter, an application scenario of the present disclosure is described by taking detection of an end surface of an optical fiber connector as an example.

The optical fiber connector is an important component to interface two optical fibers together. In the field of communication, in order to ensure signal transmission quality, the newly polished connector end faces has to be detected. The detection and control are mainly directed to key geometric parameters, such as curvature radius of the end surface, apex-offset of the end surface, inclination angle of the end surface, undercut of fiber, and roughness of the end surface of the optical fiber connector. In engineering practice, there is a standard on whether the end surface of the optical fiber connector produced is qualified. If various physical parameters of the end surface are in a range specified in the standard, the optical fiber connector is regarded as qualified. The physical parameter estimating method according to the embodiments of the present disclosure can be used to estimate the curvature radius and the apex-offset of the end surface of the optical fiber connector, so as to decide whether the grinded end surface of the optical fiber connector is appropriate for being shipped and brought into use.

Figure 9:
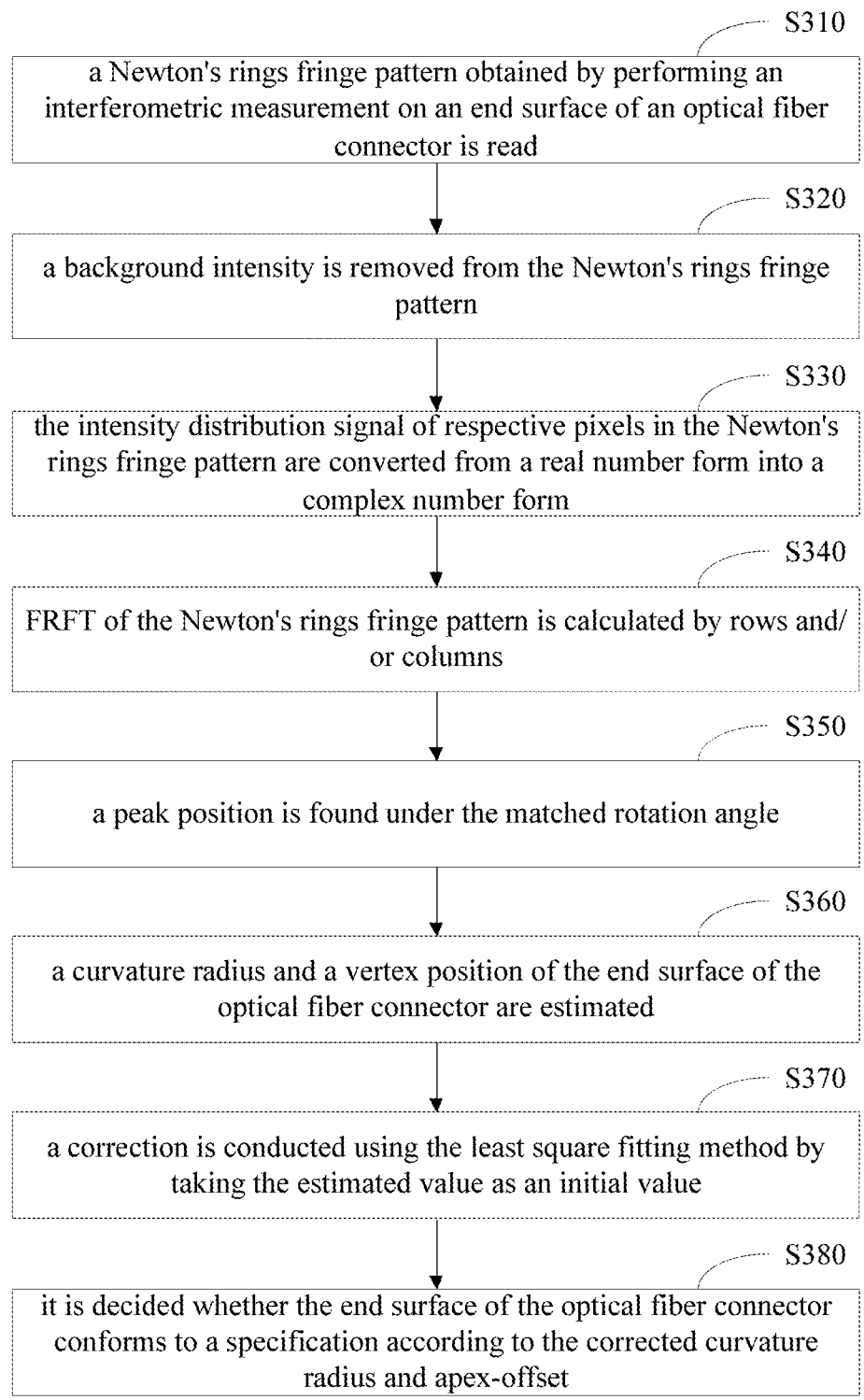
FIG. 9 illustrates a flow chart of an application scenario in which the physical parameter estimating method is used to detect an end surface of an optical fiber connector according to an embodiment of the present disclosure.

FIG. 9 illustrates a flow chart of an application scenario in which the physical parameter estimating method is used to detect an end surface of an optical fiber connector according to an embodiment of the present disclosure.

As shown in FIG. 9, a method for detecting an end surface of an optical fiber connector includes:

In step S310, a Newton's rings fringe pattern obtained by performing an interferometric measurement on an end surface of an optical fiber connector is read.

In step S320, a background intensity is removed from the Newton's rings fringe pattern.

In step S330, the intensity distribution signal of respective pixels in the Newton's rings fringe pattern are converted from a real number form into a complex number form.

In step S340, fractional Fourier transform (FRFT) of the Newton's rings fringe pattern is calculated by rows and/or columns.

In step S350, a peak position is found under the matched rotation angle.

In step S360, a curvature radius and a vertex position of the end surface of the optical fiber connector are estimated.

In the step S370, a correction is conducted using the least square fitting method by taking the estimated value as an initial value.

Since the steps S310 to S370 have been already explained in the above embodiments, the detailed description thereof is omitted here.

In step S380, it is decided whether the end surface of the optical fiber connector conforms to a specification according to the corrected curvature radius and apex-offset.

After obtaining the curvature radius and the apex-offset of the end surface of the optical fiber connector, they are compared with a production standard. If the curvature radius and the apex-offset of the end surface are in a range specified in the standard, the optical fiber connector is regarded as qualified; otherwise, it is regarded as defective. For example, after deriving the vertex position of the end surface, a difference between the vertex position and the position of the fiber is calculated, and this difference (also called apex-offset) is compared with the standard to decide whether the end surface of the optical fiber connector is qualified.

Exemplary Device

Hereinafter, physical parameter estimating devices according to respective embodiments of the present disclosure are described with reference to FIGS. 10 and 11.

Figure 10:
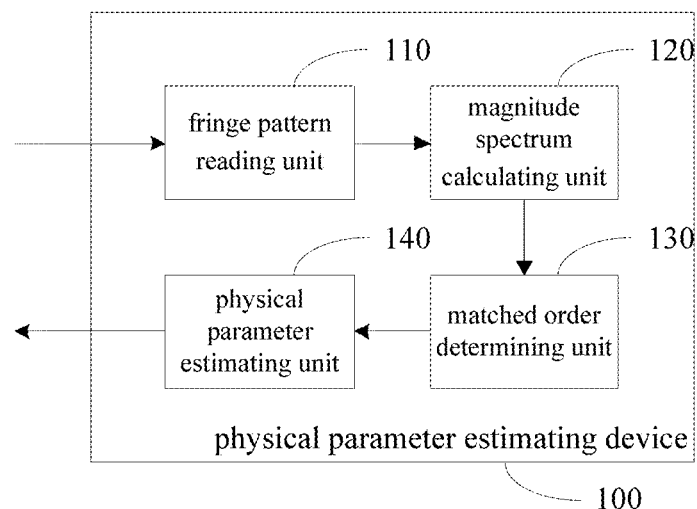
FIG. 10 illustrates a block diagram of a physical parameter estimating device according to the first embodiment of the present disclosure.

FIG. 10 illustrates a block diagram of a physical parameter estimating device according to the first embodiment of the present disclosure.

As shown in FIG. 10, a physical parameter estimating device 100 according to the first embodiment of the present disclosure may include: a fringe pattern reading unit 110 for reading a Newton's rings fringe pattern obtained by performing an interferometric measurement on a unit to be measured; a magnitude spectrum calculating unit 120 for calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; a matched order determining unit 130 for determining a matched order of the intensity distribution signal according to the calculated magnitude spectrums; and a physical parameter estimating unit 140 for estimating a physical parameter involved in the interferometric measurement according to at least the matched order.

In one example, the physical parameter estimating device 100 may further include a pre-processing unit for, after reading a Newton's rings fringe pattern obtained by performing an interferometric measurement on a unit to be measured by the fringe pattern reading unit 110, and before calculating a magnitude spectrum of an intensity distribution signal of at least one first-direction pixel set in the Newton's rings fringe pattern under each fractional Fourier transform (FRFT) order in a searching range of FRFT orders by the magnitude spectrum calculating unit 120, performing at least one of the following operations: removing a background intensity from the Newton's rings fringe pattern; converting the intensity distribution signal of the at least one first-direction pixel set in the Newton's rings fringe pattern from a real number form into a complex number form; and determining ranges of at least some parameters among physical parameters involved in the interferometric measurement according to environment and requirement of the interferometric measurement, determining a value range of a FRFT order according to the ranges of the at least some parameters, and dividing the value range with a proper step size to determine the searching range of FRFT orders.

In one example, the at least one first-direction pixel set includes only one first-direction pixel set, and the magnitude spectrum calculating unit 120 performs a one-dimension (1-D) FRFT on the intensity distribution signal of the first-direction pixel set under each FRFT order to obtain a 1-D magnitude spectrum for the first-direction pixel set under the FRFT order.

In one example, the matched order determining unit 130 determines a magnitude peak of each of the 1-D magnitude spectrums for the first-direction pixel set; and finds a 1-D magnitude spectrum having a maximum magnitude peak among the 1-D magnitude spectrums for the first-direction pixel set; and determines a FRFT order corresponding to the 1-D magnitude spectrum having the maximum magnitude peak as the matched order.

In one example, the at least one first-direction pixel set includes a plurality of first-direction pixel sets, and with respect to each first-direction pixel set of the plurality of first-direction pixel sets, the magnitude spectrum calculating unit 120 performs a one-dimension (1-D) FRFT on the intensity distribution signal of the first-direction pixel set under each FRFT order to obtain a 1-D magnitude spectrum for the first-direction pixel set under the FRFT order.

In one example, with respect to each first-direction pixel set of the plurality of first-direction pixel sets, the matched order determining unit 130 determines a magnitude peak of each of the 1-D magnitude spectrums for the first-direction pixel set; finds a 1-D magnitude spectrum having a maximum magnitude peak among the 1-D magnitude spectrums for the first-direction pixel set; and determines a FRFT order corresponding to the 1-D magnitude spectrum having the maximum magnitude peak as a matched order for the first-direction pixel set; and determines the matched order of the intensity distribution signal by averaging the matched orders for the plurality of first-direction pixel sets.

In one example, the physical parameter estimating unit 140 determines a first coordinate of the maximum magnitude peak in a 1-D FRFT domain; and determines a first-direction coordinate of a center of the Newton's rings fringe pattern according to the matched order and the first coordinate, the first-direction coordinate being a coordinate in the first direction.

In one example, the physical parameter estimating unit 140 performs the 1-D FRFT on an intensity distribution signal of a second-direction pixel set in the Newton's rings fringe pattern under the matched order, to obtain a 1-D magnitude spectrum for the second-direction pixel set, the second-direction pixel set including a line of pixels in a second direction, the second direction being perpendicular to the first direction; determines a second coordinate of a magnitude peak of the 1-D magnitude spectrum for the second-direction pixel set in the 1-D FRFT domain; and determines a second-direction coordinate of the center of the Newton's rings fringe pattern according to the matched order and the second coordinate, the second-direction coordinate being a coordinate in the second direction.

In one example, the at least one first-direction pixel set includes all of the first-direction pixel sets, and the magnitude spectrum calculating unit 120 performs a two-dimension (2-D) FRFT on the intensity distribution signals of all of the first-direction pixel sets under each FRFT order to obtain a 2-D magnitude spectrum for all of the first-direction pixel sets under the FRFT order.

In one example, the magnitude spectrum calculating unit 120 performs a one-dimension (1-D) FRFT on the intensity distribution signal of each first-direction pixel set of all of the first-direction pixel sets under each FRFT order to obtain a 1-D magnitude spectrum for the first-direction pixel set under the FRFT order; synthesizes the 1-D magnitude spectrums for all of the first-direction pixel sets under the FRFT order to generate a synthesized magnitude spectrum; and continues to perform the 1-D FRFT on a magnitude distribution signal of each second-direction element set of all of second-direction element sets in the synthesized magnitude spectrum under the FRFT order to obtain the 2-D magnitude spectrum for all of the first-direction pixel sets under the FRFT order, the second-direction element set including a line of elements in a second direction, the second direction being perpendicular to the first direction.

In one example, the matched order determining unit 130 determines a magnitude peak of each of the 2-D magnitude spectrums for all of the first-direction pixel sets; finds a 2-D magnitude spectrum having a maximum magnitude peak among the 2-D magnitude spectrums for all of the first-direction pixel sets; and determines a FRFT order corresponding to the 2-D magnitude spectrum having the maximum magnitude peak as the matched order.

In one example, the physical parameter estimating unit 140 determines a coordinate set of the maximum magnitude peak in a 2-D FRFT domain; and determines a coordinate set of a center of the Newton's rings fringe pattern according to the matched order and the coordinate set, the coordinate set of the center including a coordinate in the first direction and a coordinate in the second direction.

In one example, the unit to be measured is an optical device having a surface to be measured, and the physical parameter estimating unit 140 calculates one of three physical parameters used in the interferometric measurement according to the matched order in response to knowing the other two physical parameters, the three physical parameters including a refractive index of media, a wavelength of incident light, and a curvature radius of the surface to be measured.

In one example, the physical parameter estimating device 100 may also include an error correcting unit for correcting errors in the estimated physical parameters after estimating the physical parameter involved in the interferometric measurement according to at least the matched order by the physical parameter estimating unit 140.

In one example, the error correcting unit corrects the estimated physical parameter using an intensity distribution model of the Newton's rings fringe pattern and pixel intensity values in the Newton's rings fringe pattern by taking the estimated physical parameter as an initial value for a least square fitting method.

In one example, the physical parameter estimating device 100 may also include a device quality detecting unit for comparing the estimated physical parameter with a reference physical parameter to determine a difference therebetween; deciding whether the difference is larger than or equal to a predetermined threshold; and determining that the unit to be measured does not conform to a specification for the unit in response to the difference being larger than or equal to the predetermined threshold; otherwise, determining that the unit to be measured conforms to the specification for the unit.

In one example, the unit to be measured is an optical fiber connector having an end face to be measured, and the physical parameter includes a curvature radius and apex-offset of the end face.

Figure 11:
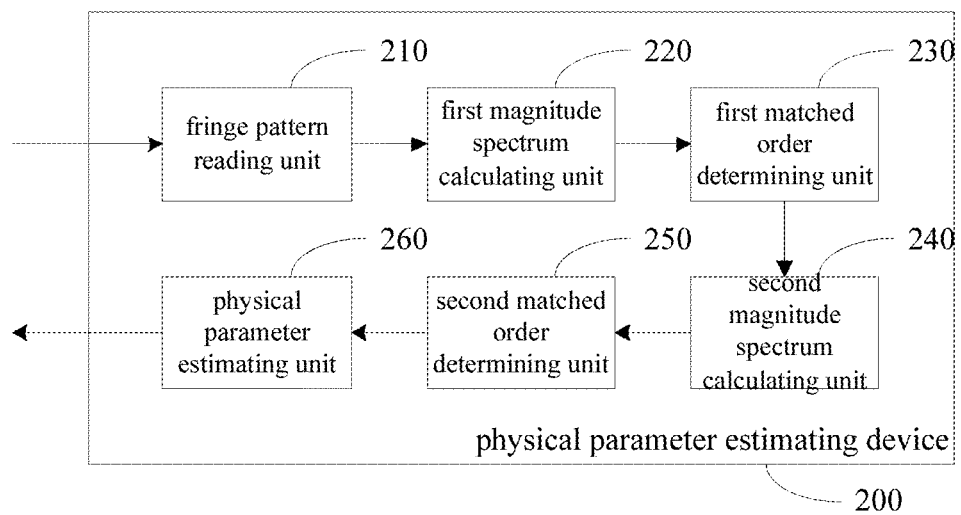
FIG. 11 illustrates a block diagram of a physical parameter estimating device according to the second embodiment of the present disclosure.

FIG. 11 illustrates a block diagram of a physical parameter estimating device according to the second embodiment of the present disclosure.

As shown in FIG. 11, a physical parameter estimating device 200 according to the second embodiment of the present disclosure may include: a fringe pattern reading unit 210 for reading an interference fringe pattern having a quadratic phase obtained by performing an interferometric measurement on a unit to be measured; a first magnitude spectrum calculating unit 220 for calculating a first magnitude spectrum of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; a first matched order determining unit 230 for determining a first matched order of the intensity distribution signal of the at least one first-direction pixel set according to the calculated first magnitude spectrums; a second magnitude spectrum calculating unit 240 for calculating a second magnitude spectrum of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; a second matched order determining unit 250 for determining a second matched order of the intensity distribution signal of the at least one second-direction pixel set according to the calculated second magnitude spectrums; and a physical parameter estimating unit 260 for estimating a physical parameter involved in the interferometric measurement according to at least the first matched order and the second matched order.

In one example, the physical parameter estimating device 200 may also include a fringe pattern dividing unit for receiving an interference fringe pattern having a complex phase higher than the quadratic phase obtained by performing the interferometric measurement on the unit to be measured; and piecewise-approximating the interference fringe pattern having the complex phase into a plurality of interference fringe patterns having the quadratic phase.

In one example, the physical parameter estimating device 200 may also include a synthesized parameter estimating unit for synthesizing the physical parameters estimated with respect to each of the plurality of interference fringe patterns having the quadratic phase to generate a synthesized physical parameter after estimating the physical parameter involved in the interferometric measurement according to at least the first matched order and the second matched order by the physical parameter estimating unit 260.

Specific functions and operations of the respective units and modules in the above-described physical parameter estimating devices 100 and 200 have been described in detail in the physical parameter estimating method described above with reference to FIGS. 1 to 9, and thus, repetitive description thereof is omitted.

Exemplary Electronic Apparatus

Hereinafter, an electronic apparatus according to the embodiments of the present disclosure is described with reference to FIG. 12. The electronic apparatus may be a computer, a server, a measuring instrument, or other apparatus.

Figure 12:
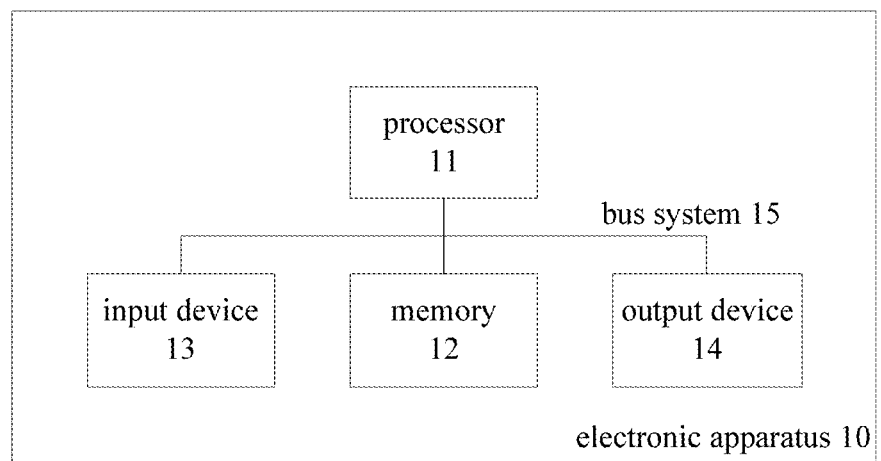
FIG. 12 illustrates a block diagram of an electronic apparatus according to an embodiment of the present disclosure.

FIG. 12 illustrates a block diagram of an electronic apparatus according to an embodiment of the present disclosure.

As shown in FIG. 12, an electronic apparatus 10 includes a processor 11 and a memory 12.

The processor 11 can be a central processing unit (CPU) or a processing unit of other form having data processing capability and/or instruction executing capability, and can control other components in the electronic apparatus 10 to execute desired functions.

The memory 12 may include one or more computer program products, and the computer program products may include various forms of computer-readable storage medium, for example, volatile memory and/or non-volatile memory. For example, the volatile memory may include a random access memory (RAM) and/or a cache memory or the like. For example, the non-volatile memory may include a read-only memory (ROM), a hard disk, a flash memory or the like. One or more computer program instructions may be stored in the computer-readable storage medium, and the processor 11 can execute the computer program instructions to implement the above-mentioned physical parameter estimating method of the respective embodiments of the present disclosure and/or other desired functions. Various kinds of interference fringe patterns, FRFT magnitude spectrums, estimated physical parameters, engineering standard of the unit to be measured, and the like may also be stored in the computer-readable storage medium.

In one example, the electronic apparatus 10 may also include an input device 13 and an output device 14, and these components are interconnected through a bus system 15 and/or other forms of connecting mechanism (not shown). It is to be noted that the components and structure of the electronic apparatus 10 shown in FIG. 12 are only exemplary but not restrictive, and the electronic apparatus 10 may also have other components and structure as necessary.

For example, the input device 13 can receive the interference fringe pattern from outside (for example, from an interferometer or the like). Of course, the interference fringe pattern may also be collected by a collecting device integrated in the electronic apparatus 10.

The output device 14 may output various kinds of information, e.g., the physical parameters, to outside (for example, the user), and may include one or more of a display, a speaker, and the like.

The input device 13 and the output device 14 may be communicated with other devices (for example, a personal computer, a server, a mobile station, a base station or the like) through network or other techniques. The network may be internet, wireless local area network, mobile communication network or the like, and other techniques may include Bluetooth communication, infrared communication or the like, for example.

Exemplary Computer Program Product and Computer-Readable Storage Medium

In addition to above-described methods and apparatus, the embodiment of the present disclosure may be a computer program product including computer program instructions, and the computer program instructions, when executed by a processor, cause the processor to execute the steps in the physical parameter estimating method according to various embodiments of the present disclosure described in the part of "Exemplary method" in this specification.

The computer program product can be written by any combination of one or more programming languages, to execute program codes of the operations of the embodiments of the present disclosure, and the programming language includes object-oriented programming language such as Java, C++ or the like, and further include traditional procedure-type programming language such as "C" language or similar programming language. The program code may be executed fully on the user's computing apparatus, partly on the user's computing apparatus, as a stand-alone software package, partly executed on the user's computing apparatus and partly on a remote computing apparatus, or fully on the remote computing apparatus or server.

Also, the embodiment of the present disclosure may be a computer readable storage medium having computer program instructions stored thereon, and the computer program instructions, when executed by a processor, cause the processor to execute the steps in the physical parameter estimating method according to various embodiments of the present disclosure described in the part of "Exemplary method" in this specification.

The computer-readable storage medium may adopt any combination of one or more readable media. The readable medium may be readable signal medium or readable storage medium. The readable storage medium may include, for example, but not limited to, an electronic, magnetic, optical, electromagnetic, infrared or semiconductor system, apparatus, or device, or any suitable combination thereof. More specific examples (a non-exhaustive list) of the readable storage medium include the following: an electrical connection having one or more wires, a portable disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Basic principal of the present disclosure is described above in combination with specific embodiments, however, it is to be noted that advantages and effects or the like set forth in the present disclosure are only example rather than limitation, these advantages and effects or the like cannot be regarded as necessary for respective embodiments of the present disclosure. Further, specific details of above-described disclosure are only for exemplary and for facilitating the understanding rather than limitation, and the present disclosure shall not be limited to being implemented only by adopting the above-described specific details.

Block diagrams of components, devices, apparatus and systems mentioned in the present disclosure are only schematic examples and are not intended to require or imply that connection, arrangement and configuration be implemented according to the manners shown in the block diagrams. Those skilled in the art would understand that these components, devices, apparatus and systems can be connected, arranged or configured in any manner. Words such as "comprise", "include", "have" or the like are inclusive words, which refer to "include but not limited to" and can be interchanged therewith. Words "or" and "and" used here refer to a word "and/or", and can be interchanged therewith, unless otherwise indicated explicitly in context. Word "for example" used here refer to word "for example but not limited to", and can be interchanged therewith.

Further, it needs to point out that, in the device, apparatus and method of the present disclosure, respective components or respective steps can be decomposed and/or re-combined. These decompositions and/or re-combinations should be regarded as equivalent schemes of the present disclosure.

The above description of the disclosed aspects is provided to make those skilled in the art capable of making or using the present disclosure. Various modifications of these aspects are obvious for those skilled in the art, and general principle defined here can be applied to other aspects without departing from range of the present disclosure. Therefore, the present disclosure does not intend to be limited to aspects illustrated here, but covers a widest range in consistent with principle and novel feature disclosed here.

The above description has been already provided in order for exemplification and description. Further, this description does not intend to limit the embodiments of the present disclosure to forms disclosed here. Although a plurality of exemplary aspects and embodiments have been already discussed above, those skilled in the art would appreciate some certain variations, modifications, changes, additions or sub-combinations thereof.

The invention claimed is:

1. A physical parameter estimating method, comprising:
   reading a Newton's rings fringe pattern obtained by performing an interferometric measurement on a unit to be measured, the interferometric measurement including irradiating the unit to be measured with light;
   calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern;
   determining a matched order of the intensity distribution signal according to the calculated magnitude spectrums; and
   estimating a physical parameter involved in the interferometric measurement according to at least the matched order.

2. The method of claim 1, further comprising, before the step of calculating a magnitude spectrum of an intensity distribution signal of at least one first-direction pixel set in the Newton's rings fringe pattern under each fractional Fourier transform (FRFT) order in a searching range of FRFT orders:
   determining ranges of at least some parameters among physical parameters involved in the interferometric measurement according to environment and requirement of the interferometric measurement;
   determining a value range of a FRFT order according to the ranges of the at least some parameters; and
   dividing the value range with a proper step size to determine the searching range of FRFT orders.

3. The method of claim 1, wherein the at least one first-direction pixel set includes only one first-direction pixel set, and the step of calculating a magnitude spectrum of an intensity distribution signal of at least one first-direction pixel set in the Newton's rings fringe pattern under each fractional Fourier transform (FRFT) order in a searching range of FRFT orders comprises:
   performing a one-dimension (1-D) FRFT on the intensity distribution signal of the first-direction pixel set under each FRFT order to obtain a 1-D magnitude spectrum for the first-direction pixel set under the FRFT order.

4. The method of claim 3, wherein the step of determining a matched order of the intensity distribution signal according to the calculated magnitude spectrums comprises:
   determining a magnitude peak of each of the 1-D magnitude spectrums for the first-direction pixel set;
   finding a 1-D magnitude spectrum having a maximum magnitude peak among the 1-D magnitude spectrums for the first-direction pixel set; and
   determining a FRFT order corresponding to the 1-D magnitude spectrum having the maximum magnitude peak as the matched order.

5. The method of claim 1, wherein the at least one first-direction pixel set includes a plurality of first-direction pixel sets, and the step of calculating a magnitude spectrum of an intensity distribution signal of at least one first-direction pixel set in the Newton's rings fringe pattern under each fractional Fourier transform (FRFT) order in a searching range of FRFT orders comprises:
   with respect to each first-direction pixel set of the plurality of first-direction pixel sets, performing a one-dimension (1-D) FRFT on the intensity distribution signal of the first-direction pixel set under each FRFT order to obtain a 1-D magnitude spectrum for the first-direction pixel set under the FRFT order.

6. The method of claim 5, wherein the step of determining a matched order of the intensity distribution signal according to the calculated magnitude spectrums comprises: with respect to each first-direction pixel set of the plurality of first-direction pixel sets, determining a magnitude peak of each of the 1-D magnitude spectrums for the first-direction pixel set;
   finding a 1-D magnitude spectrum having a maximum magnitude peak among the 1-D magnitude spectrums for the first-direction pixel set; and
   determining a FRFT order corresponding to the 1-D magnitude spectrum having the maximum magnitude peak as a matched order for the first-direction pixel set; and determining the matched order of the intensity distribution signal by averaging the matched orders for the plurality of first-direction pixel sets.

7. The method of claim 4, wherein the step of estimating a physical parameter involved in the interferometric measurement according to at least the matched order comprises:
   determining a first coordinate of the maximum magnitude peak in a 1-D FRFT domain; and
   determining a first-direction coordinate of the center of the Newton's rings fringe pattern according to the matched order and the first coordinate, the first-direction coordinate being a coordinate in the first direction.

8. The method of claim 7, wherein the step of estimating a physical parameter involved in the interferometric measurement according to at least the matched order further comprises: performing the 1-D FRFT on an intensity distribution signal of a second-direction pixel set in the Newton's rings fringe pattern under the matched order, to obtain a 1-D magnitude spectrum for the second-direction pixel set, the second-direction pixel set including a line of pixels in a second direction, the second direction being perpendicular to the first direction;
   determining a second coordinate of a magnitude peak of the 1-D magnitude spectrum for the second-direction pixel set in the 1-D FRFT domain; and
   determining a second-direction coordinate of the center of the Newton's rings fringe pattern according to the matched order and the second coordinate, the second-direction coordinate being a coordinate in the second direction.

9. The method of claim 1, wherein the at least one first-direction pixel set includes all of the first-direction pixel sets, and the step of calculating a magnitude spectrum of an intensity distribution signal of at least one first-direction pixel set in the Newton's rings fringe pattern under each fractional Fourier transform (FRFT) order in a searching range of FRFT orders comprises:

performing a two-dimension (2-D) FRFT on the intensity distribution signals of all of the first-direction pixel sets under each FRFT order to obtain a 2-D magnitude spectrum for all of the first-direction pixel sets under the FRFT order.

10. The method of claim 9, wherein the step of performing a two-dimension (2-D) FRFT on the intensity distribution signals of all of the first-direction pixel sets under each FRFT order comprises:

performing a one-dimension (1-D) FRFT on the intensity distribution signal of each first-direction pixel set of all of the first-direction pixel sets under each FRFT order to obtain a 1-D magnitude spectrum for the first-direction pixel set under the FRFT order;

synthesizing the 1-D magnitude spectrums for all of the first-direction pixel sets under the FRFT order to generate a synthesized magnitude spectrum; and continuing to perform the 1-D FRFT on a magnitude distribution signal of each second-direction element set of all of second-direction element sets in the synthesized magnitude spectrum under the FRFT order to obtain the 2-D magnitude spectrum for all of the first-direction pixel sets under the FRFT order, the second-direction element set including a line of elements in a second direction, the second direction being perpendicular to the first direction.

11. The method of claim 9, wherein the step of determining a matched order of the intensity distribution signal according to the calculated magnitude spectrums comprises:

determining a magnitude peak of each of the 2-D magnitude spectrums for all of the first-direction pixel sets;

finding a 2-D magnitude spectrum having a maximum magnitude peak among the 2-D magnitude spectrums for all of the first-direction pixel sets; and determining a FRFT order corresponding to the 2-D magnitude spectrum having the maximum magnitude peak as the matched order.

12. The method of claim 11, wherein the step of estimating a physical parameter involved in the interferometric measurement according to at least the matched order comprises: determining a coordinate set of the maximum magnitude peak in a 2-D FRFT domain; and determining a coordinate set of the center of the Newton's rings fringe pattern according to the matched order and the coordinate set, the coordinate set of the center including a coordinate in the first direction and a coordinate in the second direction.

13. The method of claim 1, wherein the unit to be measured is an optical device having a surface to be measured, and the step of estimating a physical parameter involved in the interferometric measurement according to at least the matched order comprises:

calculating one of three physical parameters used in the interferometric measurement according to the matched order in response to knowing the other two physical parameters, the three physical parameters including a refractive index of media, a wavelength of incident light, and a curvature radius of the surface to be measured.

14. The method of claim 1, wherein after the step of estimating a physical parameter involved in the interferometric measurement according to at least the matched order, further comprising:

correcting the estimated physical parameter using an intensity distribution model of the Newton's rings fringe pattern and pixel intensity values in the Newton's rings fringe pattern by taking the estimated physical parameter as an initial value for a least square fitting method.

15. The method of claim 1, further comprising:

comparing the estimated physical parameter with a reference physical parameter to determine a difference therebetween;

deciding whether the difference is larger than or equal to a predetermined threshold; and determining that the unit to be measured does not conform to a specification for the unit in response to the difference being larger than or equal to the predetermined threshold.

16. The method of claim 15, wherein the unit to be measured is an optical fiber connector having an end face to be measured, and the physical parameter includes a curvature radius and a apex-offset of the end face.

17. An electronic apparatus, comprising:

a processor;

a memory; and computer program instructions stored in the memory that, when executed by the processor, cause the processor to perform a physical parameter estimating method comprising:

reading a Newton's rings fringe pattern obtained by performing an interferometric measurement on a unit to be measured, the interferometric measurement including irradiating the unit to be measured with light;

calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern;

determining a matched order of the intensity distribution signal according to the calculated magnitude spectrums; and estimating a physical parameter involved in the interferometric measurement according to at least the matched order.

* * * * *